United States Patent [19]

Esmer et al.

[11] Patent Number: 5,161,311
[45] Date of Patent: Nov. 10, 1992

[54] CALIBRATION AND COMPENSATION OF AN ELECTRONIC COMPASS SYSTEM

[75] Inventors: Gerald P. Esmer, Holly, Mich.; Peter G. Blaney, Danville, Calif.

[73] Assignee: Alps Electric Inc., San Jose, Calif.

[21] Appl. No.: 883,816

[22] Filed: May 13, 1992

Related U.S. Application Data

[63] Continuation of Ser. No. 574,709, Aug. 29, 1990, abandoned.

[51] Int. Cl.$^5$ ............................................. G01C 17/38
[52] U.S. Cl. ........................................ 33/356; 33/361; 324/245; 324/247; 324/253
[58] Field of Search ...................... 33/355 R, 356, 361; 364/571.01, 571.02; 324/245, 247, 253, 254, 255, 257, 225, 226, 244

[56] References Cited

U.S. PATENT DOCUMENTS

| | | | |
|---|---|---|---|
| 4,402,142 | 9/1983 | Dinsmore | 33/357 |
| 4,418,480 | 12/1983 | Garner | 33/361 |
| 4,429,469 | 2/1984 | Tsushima et al. | 33/356 |
| 4,455,279 | 5/1984 | Tsushima et al. | 33/361 |
| 4,480,226 | 10/1984 | Kuno et al. | 33/356 |
| 4,497,034 | 1/1985 | Kuno et al. | 33/361 |
| 4,535,547 | 8/1985 | Kurihara et al. | 33/356 |
| 4,546,551 | 10/1985 | Franks | 33/361 |
| 4,622,754 | 11/1986 | Chujo et al. | 33/356 |
| 4,673,878 | 6/1987 | Tsushima et al. | 33/361 |
| 4,677,381 | 6/1987 | Geerlings | 33/361 |
| 4,782,453 | 11/1988 | Bauer et al. | 33/356 |
| 4,929,899 | 5/1990 | Weixelman et al. | 33/361 |
| 4,953,305 | 9/1990 | VanLente et al. | 33/356 |

FOREIGN PATENT DOCUMENTS 0099310  6/1984  Japan ..................... 33/361

OTHER PUBLICATIONS

Farr, C. T. and Anstey, E. A. R., "Reduction of Errors in Magnetic Aspect Sensors by a System of Ground Calibration", Royal Aircraft Establishment Technical Report No. 66092; Mar. 1966.

Garner, D., "A Magnetic Heading Reference for the Electro Fluidic Autopilot, Parts I & II"; Sport Aviation; Nov./Dec. 1981.

Primary Examiner—William A. Cuchlinski, Jr.
Assistant Examiner—Alvin Wirthlin
Attorney, Agent, or Firm—Skjerven, Morrill, MacPherson, Franklin and Friel

[57] ABSTRACT

An electronic compass for use in a vehicle includes compensation for attaining a high degree of accuracy without operator intervention or the need to drive the vehicle in a deliberate circular path. An automatic method for accurately determining maximum and minimum voltage values from a flux gate sensor having orthogonal sensing windings is provided that operates continuously to adjust for required changes in both the offset and gain compensation factors. The flux gate sensor is further mounted within the vehicle such that the axis of one of the sensing windings is positioned approximately 45° with respect to the vehicle's longitudinal direction. The angled mounting of the sense winding axis results in strong sensing signals when travelling on most roads. The electronic compass further provides visual representation on the outer peripheral segments of an alphanumeric display to prompt the operator to drive in a circle during a manual compensation mode. Furthermore, the same software is used during both the manual and automatic operating modes.

24 Claims, 18 Drawing Sheets

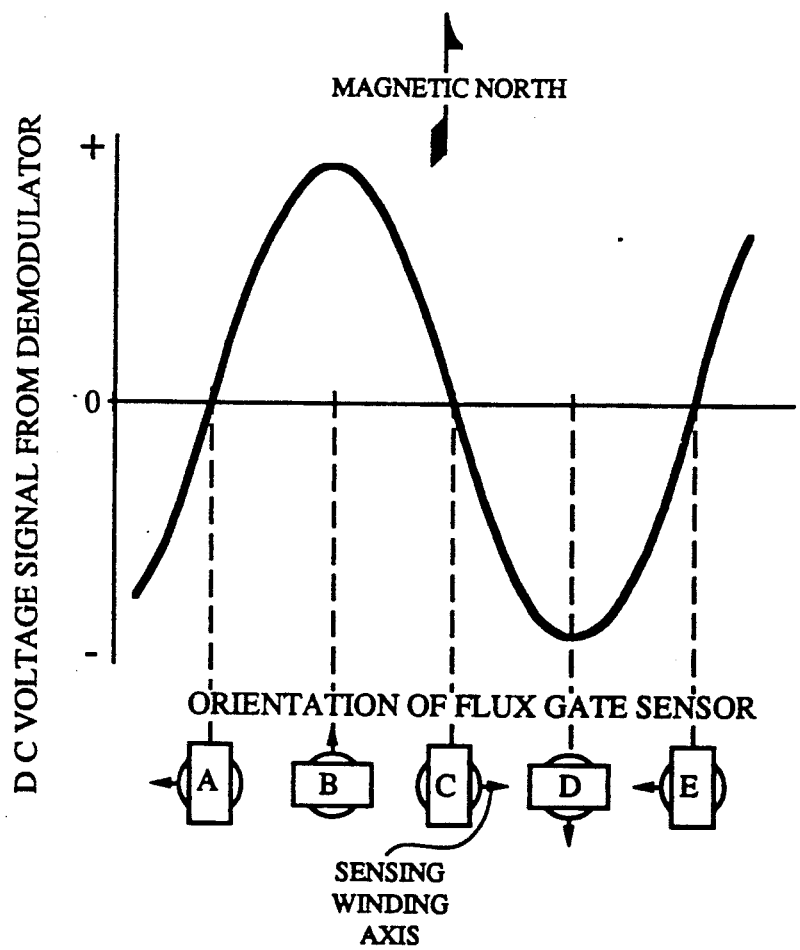

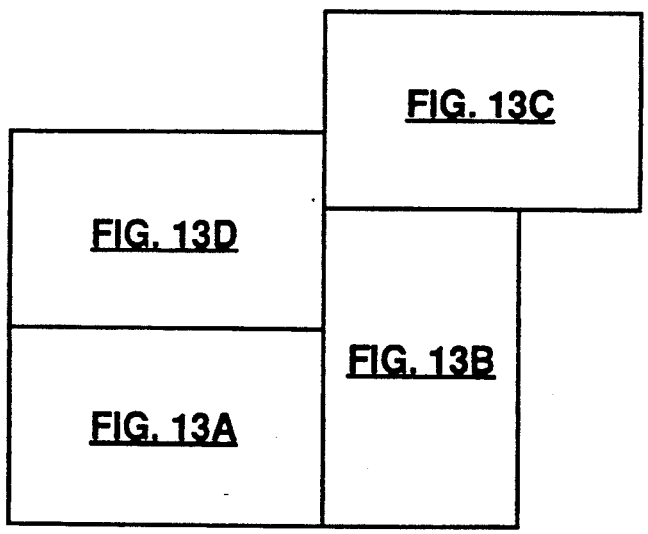
LEGEND FOR FIGURES 13A-13D

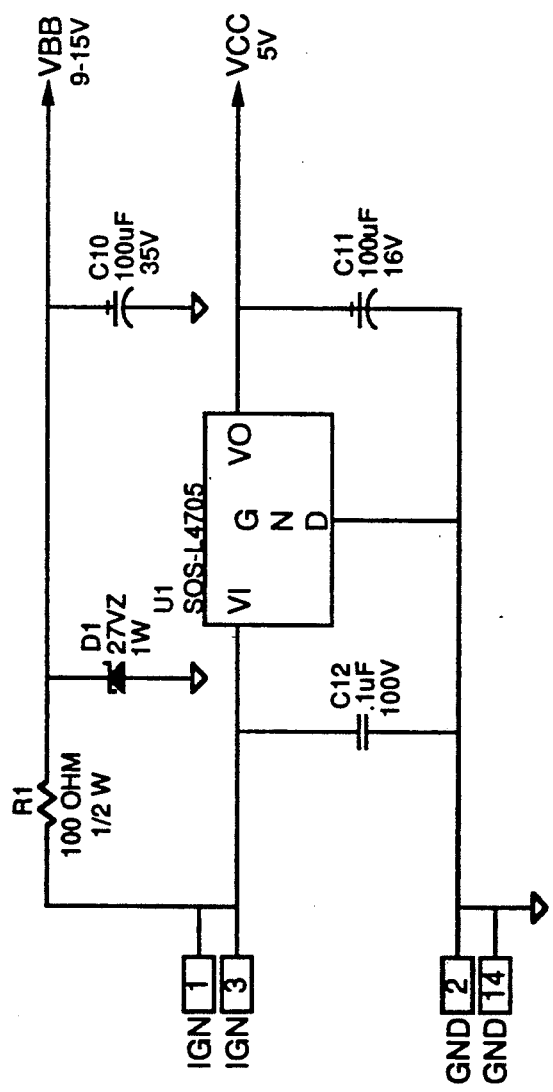

PRIMARY DRIVERS

CALIBRATION AND COMPENSATION OF AN ELECTRONIC COMPASS SYSTEM

This application is a continuation of application Ser. No. 07/574,709, filed Aug. 29, 1990 now abandoned.

BACKGROUND OF THE INVENTION

1. Field of the Invention

The present invention relates to electronic compass systems and more particularly to calibration and compensation of electronic compass systems for use in connection with the indication of a vehicle's heading.

2. Description of the Relevant Art

The electronic compass is classified within a family of instruments referred to as "magnetometers" whose function is to detect and to measure the magnitude and/or direction of magnetic fields. Electronic compasses are used, for example, within vehicles such as automobiles. In a compass for use in a vehicle, it is desirable to compensate the compass to correct for stray magnetic fields and ferromagnetic material in the vicinity of the sensor. For accuracy, a second correction for variations in the earth's magnetic field as a function of the geographic location of the vehicle is desirable. For example, in the United States, the magnetic variation between true north and magnetic north from the east coast to the west coast is approximately 40°. A compass system installed in a vehicle therefore should include means for correcting for the earth's magnetic field variation as well as means for compensating for the particular installation of the compass in an individual vehicle.

One type of electronic compass, commonly known as a "flux gate" magnetometer, is capable of detecting magnetic fields due to a phenomenon of magnetic saturation of an iron alloy core. Referring to FIGS. 1A-1D, the operating principles of the flux gate magnetometer is next explained. When referring to magnetic fields, fictional entities called "lines of flux" are employed. The lines are used to illustrate the direction and intensity of a magnetic field.

Referring to FIG. 1A, an iron alloy strip 10 having a high "permeability" and a very sharp "saturation characteristic" is disposed in parallel to the earth's magnetic field represented by the lines of flux 12. An iron alloy strip having a high permeability with a very sharp saturation characteristic can be analogously understood as having a very low "resistance" to magnetic flux, but, once a certain density of magnetic flux is flowing through it, will "saturate" and thereafter have a very high resistance to the passage of additional flux.

When iron alloy strip 10 is positioned parallel to the earth's magnetic field as in FIG. 1A, some of the lines of flux 12 divert and follow a path through alloy strip 10 since it offers less resistance to the flow of flux than does the surrounding air.

If a coil of wire 14 is placed around alloy strip 10 as in FIG. 1B, and a sufficient amount of electrical current is driven through coil 14 to "saturate" alloy strip 10, the lines of flux 12 due to the earth's field no longer divert to flow through the strip since its permeability is greatly reduced.

Thus, the strip of iron alloy 10 acts as a "flux gate" to the lines of flux 12 of the earth's magnetic field. When alloy strip 10 is not saturated, the "gate is open" and the surrounding lines of flux 12 bunch together and flow through alloy strip 10. When alloy strip 10 is saturated by passing a sufficient electrical current through coil 14, the "gate is closed" and the lines of flux 12 do not divert but instead resume paths along or very near their original paths.

A basic law of electricity dictates that when a line of magnetic flux "cuts", or passes through, an electrical conductor, a current is induced in the conductor. Thus, if an alternating current is passed through coil 14, referred to as a drive winding, the flux gate makes transitions between its opened and closed states at twice the frequency of the alternating current, and therefore the lines of flux 12 from the earth's field move in and out of the alloy strip 10 at twice the frequency of the alternating current. It is possible to arrange the lines of flux 12 to pass through a second electrical conductor, referred to as a sense winding, each time they transit between the alloy strip and the surrounding air, thereby inducing a current in the second conductor. The induced current is proportional to the intensity of that component of the earth's magnetic field which lies parallel to alloy strip 10.

One problem introduced, however, is that when alloy strip 10 is saturated, additional lines of flux are created by the magnetic field induced by current flow through drive winding 14. These additional lines of flux must be considered when devising a scheme to measure the earth's magnetic field.

One scheme used to solve this problem is illustrated in FIG. 1C. Two identical alloy strips 16 and 18 are used, and the saturation, or drive, windings 14A and 14B are arranged such that a closed magnetic circuit is formed. The lines of flux from the earth's field are diverted into and expelled from both alloy strips 16 and 18 each time the strips change between the saturated and unsaturated states. A sense winding 19 is positioned around the entire assembly as shown such that the sense winding is crossed at each passage of the lines of external flux to thus produce a voltage signal indicative of only the external flux lines. This result occurs since the lines of flux induced by drive windings 14A and 14B can build up and collapse without cutting sense winding 19.

A toroidal core 20 as shown in FIG. 1D can be used to serve the same function as the two alloy strips 16 and 18. The toroidal core flux gate includes drive winding 14 and sensing winding 19. With no air gaps at the ends, toroidal core 20 is somewhat more efficient magnetically.

Referring next to FIGS. 2A-2G, the operational details of circuitry within a typical prior art flux gate magnetometer are explained. The drive winding is excited by a square wave of a suitable frequency and amplitude (as shown in FIG. 2A) such that the core is saturated half way through each half-cycle. When the core saturates, the impedance of the drive winding is reduced to a very low value, and virtually shorts out the amplifiers supplying the drive voltage such that the drive voltage is reduced to nearly zero for the remainder of the half-cycle (FIG. 2B). As the polarity of the drive voltage reverses at the end of the first half-cycle, the core unsaturates and allows the drive voltage to reach full amplitude until the approximate center of the second half-cycle, when saturation again occurs and the drive voltage returns to near zero.

As explained above, any external magnetic field in the vicinity will be drawn into the core when the core is unsaturated, and will be expelled when it becomes saturated. Each time the external lines of flux are drawn into the core, they pass through the sense winding and generate a voltage pulse (shown in FIG. 2C) having an amplitude which is proportional to the intensity of that component of the external field which is parallel to the centerline of the sense winding. The polarity of this pulse is determined by the polarity of the external magnetic field with respect to the sense winding. When the lines of flux are expelled from the core, they cut the sense winding in the opposite direction and generate another voltage pulse of the same amplitude but of opposite polarity. Thus, the pulses of FIG. 2C are indicative of both the amplitude and direction of the earth's magnetic field with respect to the sense winding.

It should be noted that the pulse pattern of FIG. 2C is repeated twice for each cycle of the driving frequency of FIG. 2A. Consequently, the information is provided from the magnetometer at twice the frequency of the driving voltage, and thus the designation "second harmonic flux-gate magnetometer" is attached.

Several approaches for measuring the amplitude and direction of the pulse pattern are possible. For one approach, the sense winding is tuned to a frequency of twice the drive frequency to convert the series of pulses into a sine wave as shown in FIG. 2D having an amplitude proportional to the amplitude of the pulses. It should be noted that since the core is driven to saturate halfway through each drive cycle, an even spacing of the positive and negative signal pulses of FIG. 2C results and thus the pulses are efficiently converted into a sine wave by the tuned sense coil.

To convert the sine-wave signal of FIG. 2D into a DC signal, the sine wave signal is passed through a "phase-sensitive demodulator". A reference voltage which consists of a square wave having twice the frequency of and the same phase as the drive voltage as shown in FIG. 2E is required by the demodulator. The phase-sensitive demodulator inverts the polarity of the signal from the sense winding every time the reference voltage goes positive. Thus for the conditions shown in FIGS. 2E and 2F, the negative-going half of the sine wave is inverted positive and the positive-going half is unaltered, thus resulting in the waveform of FIG. 2G. This waveform is passed through a low-pass filter and therefore a positive DC signal results having an amplitude which is proportional to that of the original sine wave signal.

If the direction of the magnetic field is reversed with respect to the magnetometer, the phase of the signal shown in FIG. 2F is shifted by 180 degrees with respect to the reference voltage (FIG. 2E) and the positive half-cycles of the signal voltage are inverted, thus resulting in a negative DC signal.

Another approach for measuring the amplitude and direction of the pulse pattern induced in the sense winding involves a microcomputer. A demodulator controlled by the microcomputer receives the pulse signal through a wide band amplifier. The demodulator processes the pulse signal shown in FIG. 2C and provides a DC output signal having an amplitude proportional to the pulse signal. This approach eliminates phase shift errors due to component value changes and eliminates the need for adjusting tuned circuits in production.

The overall result for either approach is shown in FIG. 3 wherein the DC output signal level variation is recorded as the sensitive axis of the magnetometer (the centerline of the sense winding) is kept horizontal and rotated through 360° with respect to the earth's magnetic field. Orientation reference positions of the flux gate sensor are indicated with reference letters A–E. For example, when the flux gate is positioned with its sensitive axis parallel to the north-south direction as in orientation B, the output signal is maximum.

If a second sense winding 19B is wrapped around a toroidal core in quadrature with respect to the first sense winding 19A as shown in FIG. 1E, a second DC voltage is induced in the additional sense winding. A compass having two sense windings arranged in quadrature is referred to as a two axis compass. As illustrated in FIG. 4, as the orientation of the two axis compass heading is varied (from −180 degrees to 180 degrees with respect to north), the output voltage signals from both windings vary in a manner similar to that of FIG. 3. Extrema in the second sense winding voltage occur wherever the output voltage across the first sense winding is zero. Thus, by monitoring the DC voltage signals generated across the sense windings, the directional heading of the two axis compass can be determined since every directional orientation corresponds to exactly one set of DC voltage levels induced in the sense windings.

When used within a vehicle, the flux gate sensor of such an electronic compass can be mounted on the vehicle such that the axis of one of the sensing windings is parallel to the longitudinal axis of the vehicle. The direction of the vehicle can thereby be determined. For example, if the vehicle is headed due north and the flux gate sensor is mounted on the vehicle such that the axis of the second sensing winding is oriented as in position C parallel to the longitudinal axis of the vehicle, it is apparent with reference to FIG. 4 that the output signal from the first sensing winding is zero while the output signal from the second sensing winding is maximum.

Unfortunately, although the theory of operation of an electronic compass having a flux gate sensor is straightforward, many problems have been encountered in practice when used within vehicles such as automobiles. One problem described earlier is compensation for variations in the earth's magnetic field as a function of geographic location. Another problem described earlier is compensation for stray magnetic fields and ferromagnetic material in the vicinity of the sensor.

To correct for errors in magnetic variations between true north and magnetic north, the automobile is aligned in a direction known to be true north and, after depressing a variation switch, a reading is taken by a microprocessor which monitors the sensor output signals. The angular difference between this reading and what the reading should be for true north represents the variation correction and is stored in a memory for use in adjusting successive directional signals.

To compensate for stray magnetic fields exterior to the vehicle, such as disturbances introduced when driving over railroad tracks or near other large steel structures that have become magnetized, software filtering may be employed. Using software filtering, variations in the sensor signals that are characteristic of the stray disturbances are detected and filtered to prevent unwanted changes in the heading indications of the compass.

Several correction techniques may be used to correct for the effects on the compass of residual magnetic fields present in the particular vehicle to which the compass is mounted. For one method, called a drive in a circle method, the calibration is initiated with a switch or other means. The car is then driven in a circle on a relatively flat road at a constant speed. During this time, the system takes a number (say 100) of readings of the sensor winding output signals, searching for maximum and minimum values. By recording the extrema of each of the sensing winding output signals, the appropriate compensation factor can be applied by the processing unit since the extrema are known to occur at certain flux gate positions relative to magnetic north. The processing unit mathematically derives four compensation factors which are used to adjust the reading from the two axes before computing the relative heading angle. These adjustments compensate for distortions in the magnetic fields caused by magnetic material in the vehicle near the sensor. The adjusted or compensated readings give more accurate readings of the vehicle heading. This calibration technique is well known in the art, as shown, for example, in U.S. Pat. No. 3,991,361 issued Nov. 9, 1976, and in Farr, C. and Anstey, E.; *Reduction of Errors In Magnetic Aspect Sensors By A System of Ground Calibration*; Royal Aircraft Establishment Technical Report No. 66092; March, 1966. The above documents are incorporated herein by reference.

The four factors referred to above are offset compensation (two values, one for each axis) and gain compensation (two values, one for each axis). Offset compensation is a linear offset of the sensor readings from stray magnetic fields caused by magnetic material in the vicinity of the sensor. Stray magnetic fields cause the largest errors and affect the compass accuracy in all directions. Gain compensation is a scalar correction that corrects for different magnetic sensitivities of the sensor along its two axes caused by shunting effects of ferrous material in the vicinity of the sensor. Gain errors are sometimes called elliptical errors since the locus of points from the sensor describe an ellipse instead of a true circle when one axis has a greater sensitivity than the other. Gain errors are much less critical than offset errors and only affect the compass accuracy when neither flux gate sensor axis is aligned close to magnetic north.

The offset caused by magnetized material in the vehicle is constant for all orientations of the vehicle and thus can be computed as the average of the maximum and minimum values recorded as the vehicle is driven in a circle, i.e. $(Vmax+Vmin)/2 = $ offset compensation. The gain errors can be compensated by normalizing the offset compensated readings to a maximum value of $+/- 1$. This normalizing factor is therefore equal to the reciprocal of one half the difference between the maximum and minimum values recorded as the vehicle is driven in a circle i.e. $2/(Vmax-Vmin) = $ gain compensation.

In implementing the drive in a circle correction method, extrema in the sensor output voltage of each axis are typically determined by monitoring the zero-voltage crossings of the first derivative with respect to time of the sensor output voltage. However, for a sinusoidal waveform, the slope of the sensor output voltage in the vicinity of the extremum is extremely low. Thus, the exact location and value of an extremum is difficult to determine since the sensing circuitry is subject to the effects of electrical noise.

SUMMARY OF THE INVENTION

An electronic compass for use in a vehicle which includes compensation means in accordance with the present invention attains a high degree of accuracy without operator intervention or the need to drive the vehicle in a deliberate circular path. The present invention provides an automatic method for accurately determining maximum and minimum voltage values from a flux gate sensor having orthogonal sensing windings. The automatic compensation operates continuously to adjust for required changes in both the offset and gain compensation factors. The signals provided from the orthogonal sensing windings are relatively strong during most operating conditions.

According to one aspect of the invention, a maximum or minimum voltage from one of the sensing windings is determined by processing the voltage signal from that sensing winding and by simultaneously processing the voltage signal provided from the other sensing winding. A particular maximum or minimum is stored and used for compensation adjustment only if certain conditions in both sensor output signals occur.

According to another aspect of the invention, the orthogonal sensors of the compass are mounted on the vehicle such that one of the axes is positioned at an angle of approximately 45° with respect to the longitudinal axis of the vehicle. In this orientation, strong signals are generated by both axes of the flux gate sensor when driving on roads that are situated in north-south or east-west directions. Since there is a propensity to build roads in the U.S. in north-south and east-west directions due to early U.S. legislation, strong signals, along with strong derivative signals, are generated while driving on the road system, thus allowing for accurate extremum detection for compensation. As a result, any algorithm which uses the signals or their derivatives to determine an extremum will be relatively immune to false detection. Similarly, any algorithm which uses both the signals and their derivatives (explicitly or implicitly) should be very immune to false detection of an extremum. Extremum detection is enhanced and the possibility for false detection is minimized since, as the vehicle turns from one road onto another, an extremum value is passed crisply in a short period of time. That is, the sensor output signals reach an extremum value only when turning from one road onto another while driving on such a road system. Thus, the time exposure to the effects of electrical noise as the vehicle passes through the vicinity of an extremum is limited.

An electronic compass including compensation means in accordance with the invention may further include software algorithms executed by a microprocessor to allow different display types for providing information to an operator. Automatic or manual compensation may be programmed. In a manual compensation mode, a display technique allows an inexpensive indication to prompt the operator to drive the vehicle in a circle. An added feature of the selected approach is that the same software for extremum detection is executed during both manual and automatic calibration. Software "filtering" may be included to provide a steady display which reduces the unwanted effects of outside disturbances that distort or interrupt the earth's magnetic field. The electronic compass may finally provide for the introduction of a display offset to account for magnetic variation (the difference between true north and magnetic north), and may also provide for other optional features as described herein.

These and other advantages are achieved in the present invention, in accordance with which an electronic compass comprises a magnetic field sensing means having a plurality of output lines wherein each provides an output signal indicative of the earth's magnetic field. A detection means is coupled to each of the output lines for generating an extremum detection signal dependent upon the signals from at least two of the output lines and indicative of the occurrence of a relative extremum value with respect to the position of the sensor within the earth's magnetic field. A compensation means is coupled to the detection means for providing a compensated direction signal indicative of the position of the sensor within the magnetic field and dependent upon the extremum detection signal.

In accordance with another aspect of the invention, an electronic compass comprises a flux gate sensor having a primary winding, a first sensing winding for generating a first sensing signal, and a second sensing winding orthogonally situated with the first sensing winding for generating a second sensing signal. A driving means is coupled to the primary winding, and a signal processing means is coupled to the first and second sensing windings for determining the location of an extremum in the first sensing signal relative to the position of the sensor. The signal processing means provides an output signal which indicates the occurrence of an extremum for compensating the compass only when selected conditions in the first and second sensing signals occur.

In accordance with a further aspect of the invention, an electronic compass system for use in a vehicle comprises a flux gate sensor having a primary winding, a first sensing winding for providing a first sensing signal, and a second sensing winding orthogonally situated with the first sensing winding for providing a second sensing signal. Signal processing means is coupled to the first and second sensing windings for providing an output signal indicative of the directional position of the flux gate sensor. A mounting means is further provided for supporting the flux gate sensor on the vehicle such that the axis of the first sensing winding is situated at an angle other than 0 degrees, such as from 30 to 60 degrees, relative to the longitudinal direction of the vehicle.

In accordance with still a further aspect of the invention, an electronic compass comprises a magnetic of the sensor within the earth's magnetic field. Detection means is coupled to each of the output lines and uses a preprogrammed routine for generating an extremum detection signal indicative of the occurrence of a relative extremum value in one of the output signals with respect to the position of the sensor within the earth's magnetic field. Mode selecting means is further provided for selecting either manual compensation mode or an automatic compensation mode. Manual compensation means is coupled to the mode selecting means and to the detection means for providing a first compensated direction signal indicative of the position of the sensor within the magnetic field wherein the first compensated direction signal is dependent upon the extremum detection signal and is used for driving a display, and wherein during the manual compensation mode the detection means executes the preprogrammed routine to detect extremum values as the angular position of the sensor is varied approximately 360 degrees. Finally, automatic compensation means is connected to the mode selecting means and to the detection means for providing a second compensated direction signal indicative of the position of the sensor within the magnetic field wherein the second compensated direction signal is dependent upon the extremum detection signal and is used for driving a display. During the automatic compensation mode, the detection means executes the preprogrammed routine to detect extremum values as the angular position of the sensor is varied randomly.

In accordance with a final aspect of the invention, an electrical compass comprises sensing means for providing at least one output signal indicative of the earth's magnetic field relative to the position of the sensing means. A display means is further provided having a plurality of display elements. A processing means is coupled between the sensing means and the display means for sequentially energizing selected display elements such that angular positions of energized display elements relative to a reference point on said display means substantially correspond to an angular position of the compass relative to the earth's magnetic field. The processing means may alternatively be implemented to sequentially energize selected display elements arranged in an approximate circular path to prompt the operator to rotate the compass 360 degrees.

The invention will be more readily understood by reference to the drawings and the detailed description. As will be appreciated by one skilled in the art, the invention is applicable to electronic compasses in general, and is not limited to the specific embodiment disclosed.

BRIEF DESCRIPTION OF THE DRAWINGS

FIG. 3 illustrates the output signal from a flux gate magnetometer sensor with respect to direction.

FIGS. 13A–13D show a schematic diagram of a specific embodiment of the electronic compass.

DETAILED DESCRIPTION

Figure 5:
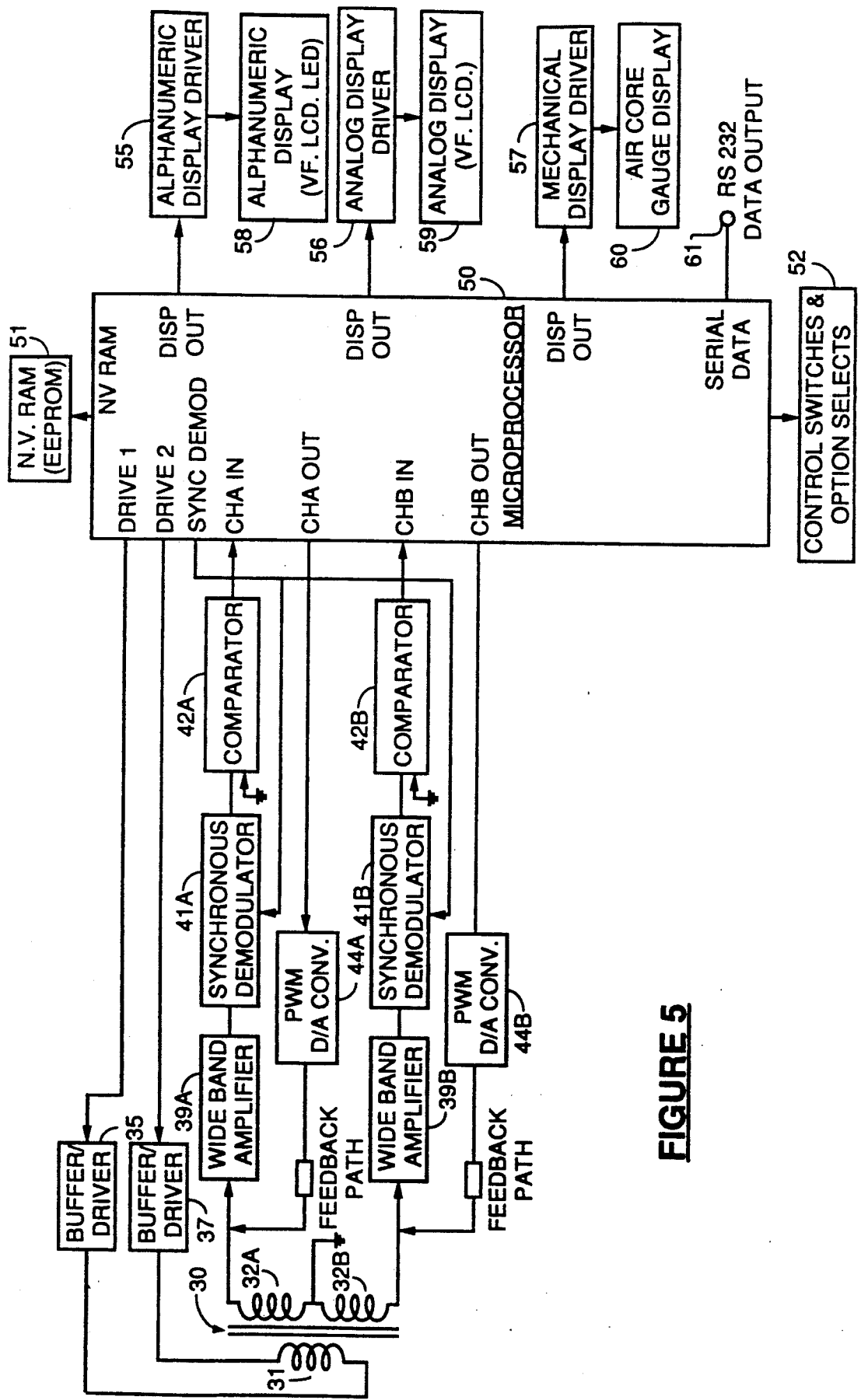
FIG. 5 shows a block diagram of a flux gate electronic compass with which the present invention may be adapted.

A block diagram of a flux gate electronic compass with which the present invention may be adapted is shown in FIG. 5. In this embodiment, the magnetometer includes a flux gate sensor 30 having a toroidal core of a highly permeable magnetic material with a primary winding 31 wrapped around its circumference and two sensing windings 32A and 32B wrapped around its exterior.

The electronic compass further includes buffer drivers 35 and 37 coupled to primary winding 31 and wide band amplifiers 39A and 39B coupled to sensing windings 32A and 32B, respectively. Amplifier 39A is coupled to a synchronous demodulator 41A and to a comparator 42A. Similarly, amplifier 39B is coupled to a synchronous demodulator 41B and to a comparator 42B. PWM (Pulse width modulated) digital-to-analog converters 44A and 44B are further connected back to sensing windings 32A and 32B, respectively.

During operation, primary winding 31 is driven by buffer drivers 35 and 37 which are supplied with an alternating current of a frequency F, where F is the frequency of the primary excitation signal from the Drive 1 and Drive 2 output pins of microprocessor 50.

Sensing windings 32A and 32B are physically disposed at right angles to each other in sensor 30 and in accordance with the theory of operation of flux gate sensors explained above, operate to produce signals which are indicative of the North/South and East/West orientations, respectively, of the sensor 30. The sensor orientation information is contained in the second harmonic content of the sensor output signals. To extract this 2f or second harmonic content, the sensor signals are supplied through amplifiers 39A and 39B, to synchronous demodulators 41A and 41B, and then to comparators 42A and 42B. A second harmonic signal is supplied from microprocessor 50 from an output labelled "SYNC DEMOD" to both synchronous demodulators 41A and 41B. Demodulators 41A and 41B in conjunction with comparators 42A and 42B operate to extract the 2f or second harmonic content in the signals from windings 32A and 32B. The output signals from comparators 42A and 42B are supplied as input signals to microprocessor 50 at input ports labelled "CHA IN" and "CHB IN", respectively.

Feedback paths are provided to sensing windings 32A and 32B from microprocessor 50 from outputs labelled "CHA OUT" and "CHB OUT" through pulse width modulated digital-to-analog converters 44A and 44B to provide sensor feedback stability, as is well known in the flux gate sensor art.

Signals representing the direction information are supplied from microprocessor 50 to a digital display driver 55 which drives a digital display 58, which may be a vacuum fluorescent (VF) display, a liquid crystal display (LCD) or a light emitting diode (LED) display.

An analog display 59 driven by an analog display driver 56 may also be provided to present graphic analog information such as a representation of an automobile, a road, and a direction. The automobile operator may further select an alpha display (N, NW, etc.) of compass information or a numeric display (180°, 45°, etc.).

Finally, a mechanical display driver 57 is connected to microprocessor 50 for driving a mechanical display, such as an air core gauge display 60. An RS-232 data port 61 is further provided for connection to other systems. It can also be used to drive some of the displays 58, 59, 60 if an appropriate interface (or interface integrated circuit) is used.

Figure 5A:
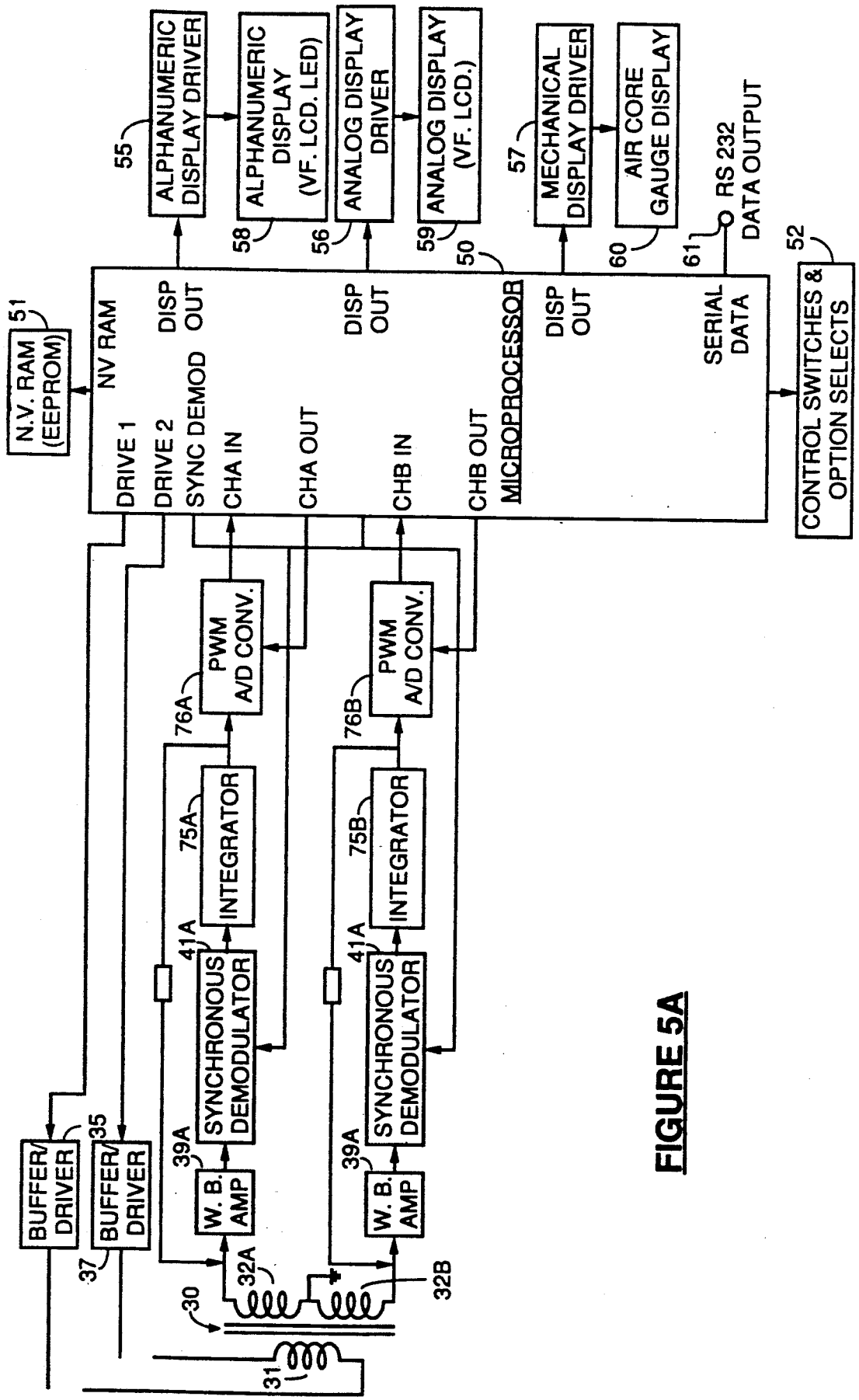
FIG. 5A shows a block diagram of a second embodiment of the electronic compass.

FIG. 5A shows a block diagram of a second embodiment of the electronic compass having a pair of integrators 75A and 75B and a pair of PWM A/D converters 76A and 76B. The circuitry of this embodiment allows faster operation, as is known in the art.

As discussed previously, the maximum and minimum values of the signals from the orthogonal sensing windings 13a and 13b are used for compensation of an electronic compass. In order to eliminate the necessity of operator intervention, an electronic compass in accordance with one aspect of the invention automatically detects maximum and minimum sensor values to provide compensation. Since extrema are known to occur at predeterminable directional locations, after detecting an extremum, successive directional readings can be compensated appropriately.

Figure 4:
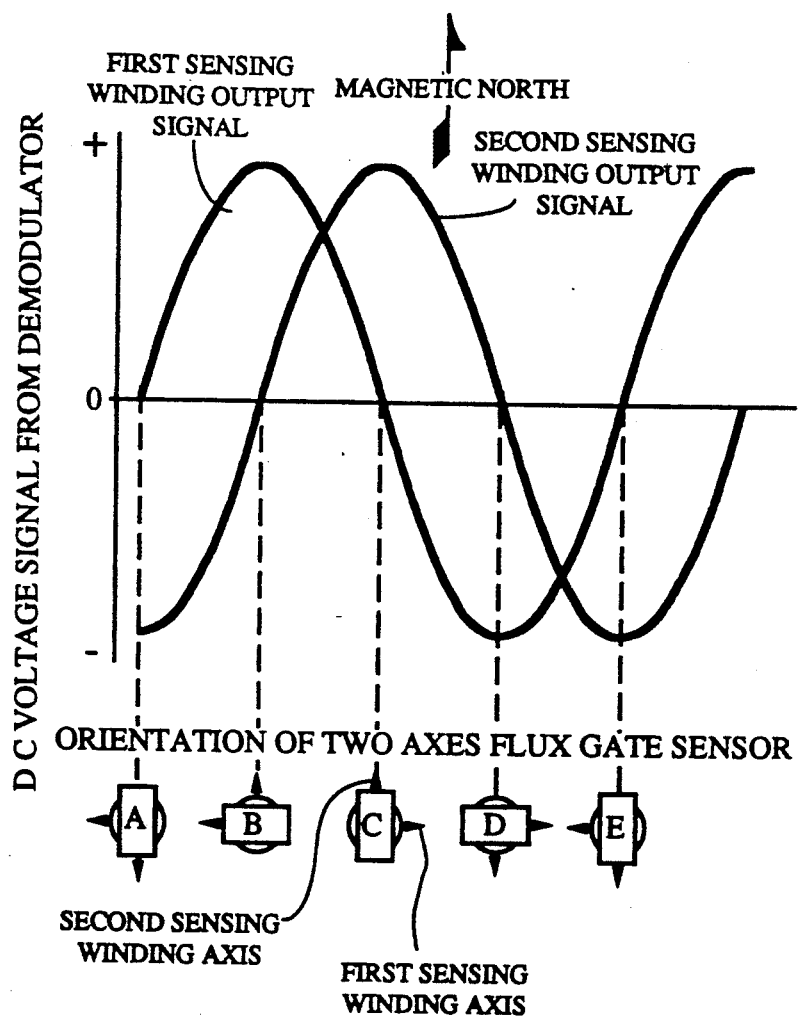
FIG. 4 illustrates the output signals from a two axis flux gate sensor.

To automatically detect the maximum and minimum values of the sensor output signals as the vehicle is driven along any random path, the information from both channels of the sensor (output signals from both sensing windings) are monitored simultaneously. The signals from the two axes of the sensor are indicative of the sine and cosine of the vehicle's heading as illustrated in FIG. 4. The reliability of detecting an extremum is enhanced by monitoring both channels. For example, if a vehicle begins a turn to the west and then turns back to the east, the information provided by one of the sensing windings is an increasing voltage followed by a decreasing voltage. Such a signal characteristic would falsely appear as an extremum input to the processor 50, although not a correct extremum. Another problem involved when the information from a single axis is used to automatically determine if the vehicle has been turned past an extremum is introduced since the readings from the sensor 30 are changing very slowly near the maximum and minimum, and it is difficult to determine if the vehicle is actually turning or if the variations in the readings are caused by noise.

According to the invention, the determination of an extremum in one of the sensor signals is dependent upon the signals from both sensing windings 32A and 32B. It should be noted that when the A channel signal derived from sensing winding 32A is near an extremum, the B channel signal derived from sensing winding 32B is changing at its maximum rate and visa-versa. This information is used to verify that the vehicle is in fact turning and that it is continuing to turn in a constant direction. If the vehicle does not turn through the point of maximum sensor output in a smooth constant pattern, the extremum data is ignored. This algorithm is explained in more detail below.

The electronic compass of FIG. 5 is capable of optionally introducing a variation offset into the display by the operator. The amount of variation required to have the electronic compass display map north for magnetic north varies depending on where the vehicle is located introduce the variation offset, the vehicle is oriented in the desired true north direction and an operator depresses a variation switch. The variation switch is one of several switches contained in the control switches and option selects block 52. The difference between this direction and magnetic north therefore becomes the amount by which the display is offset. This value is stored in the electronic compass in nonvolatile memory 51 until it is changed by the operator or reset. The variation value can be reset to zero by depressing the variation switch and holding it for 4 seconds.

Since the earth's magnetic field is not very strong, the information sent by microprocessor 50 to the display drivers 55, 56, 57 is internally filtered to minimize disturbances introduced when driving over railroad tracks, bridges, or overpasses, or next to large steel structures. The filtering algorithm limits the angular rate of change to 6 degrees per second (typical maximum vehicle turning rate at highway speeds). In addition, when a change in display position is indicated by the compass sensor 30, the display output change is first delayed by one second. Then, if the sensor 30 still indicates a change is required in the same direction, then the display output is updated. If the error direction has changed since the last update, the update is delayed for an additional 2 seconds. These delays essentially lock the display onto the last valid compass direction when significant variations are seen from an average reading. This technique minimizes the visible effects from such magnetic disturbances. When the sensor input consistently changes in one direction, the display follows the change with minimal lag.

Figure 6:
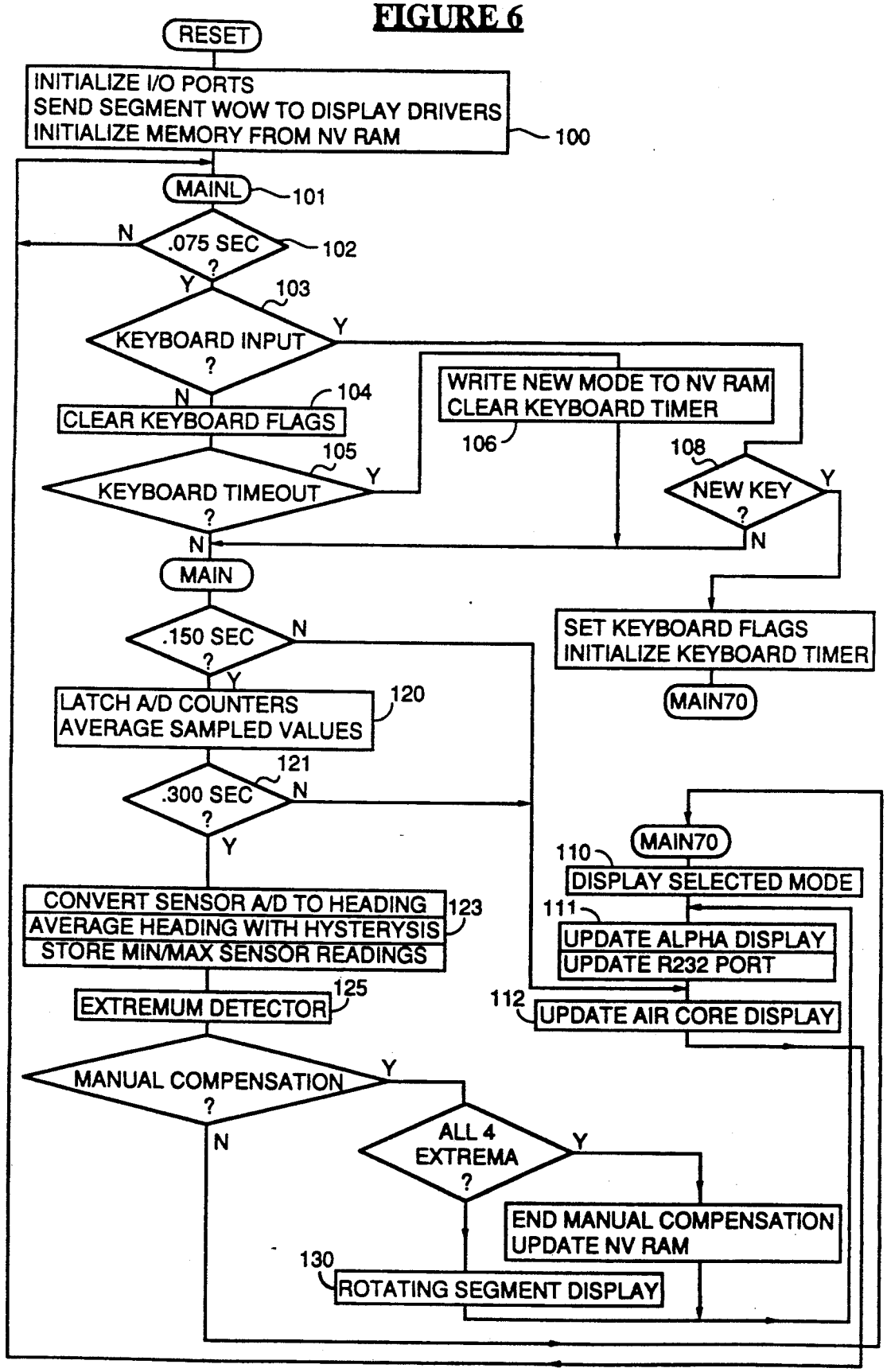
FIG. 6 shows an operational flow chart for an electronic compass.

A general flow chart illustrating the different modes of the electronic compass is shown in FIG. 6. The system is first initialized during step 100 upon being reset. During the system initialization step 100, the I/O ports are initialized to define input ports, output ports, and initial starting states. In addition, segment WOW is sent to display drivers 55, 56, 57 to verify display operation. Finally, a RAM memory within microprocessor 50 is initialized with data from nonvolatile (NV) RAM 51. After initialization, the system enters a main loop at step 101. Following a short delay introduced at step 102, a keyboard (included within control switches and option selects block 52) is monitored at step 103 to determine whether the user desires a particular change in the operation or display mode of the electronic compass. If no key is selected, the keyboard flags are cleared (step 104). If a time period referred to as the keyboard timeout has elapsed (step 105), the new mode is written to the nonvolatile RAM 51 (step 106). The keyboard timeout period reduces repetitive writes to the nonvolatile RAM 51 when changing between operation and display modes.

If a new key is selected (step 108), the keyboard flags are set and the keyboard timer is initialized. Step 110 is next entered by way of the flow diagram-connector blocks labeled "MAIN70". If a new key is selected, the selected display mode is set and each display is updated (steps 110-112). The system thereafter returns to the main loop at step 101.

After the user completes selection of the operational and display modes of the compass via the keyboard, and the selected displays are updated, microprocessor 50 samples and averages the signals received at the channel A and channel B input ports during step 120. After a short delay (step 121), t he directional heading is next computed at step 123. Maximum and minimum sensor values are determined and stored in the memory of microprocessor 50 during the extremum detector step 125. In addition, if the automatic compensation mode is selected, the new extremum averages are calculated and stored in nonvolatile RAM 51 during extremum detector step 125. Extremum detector step 125 is explained in more detail below. As shown in FIG. 6, if manual compensation mode is not selected, the displays are updated during steps 110-112 following extremum detector step 125.

If manual compensation mode is selected, a rotating display procedure is performed during steps 130 and 110-112 to confirm that a manual calibration is in process and prompt the operator to drive the vehicle in a closed path or circle. This rotating display procedure is also explained in more detail below. As the vehicle is driven in a circle during the manual compensation mode, the rotating display mode is used (rotating display is energized) at each pass through the software until all four extrema are detected at step 125. After all four extrema are detected as the vehicle is driven in a circle, the nonvolatile RAM 51 is updated at step 131 and the manual compensation procedure is terminated.

In either mode, after the locations of the extrema are determined and the nonvolatile memory 51 is updated for use in compensating the compass for successive readings, one or more of the displays are driven to indicate the vehicle's directional heading during steps 110-112.

Figure 7:
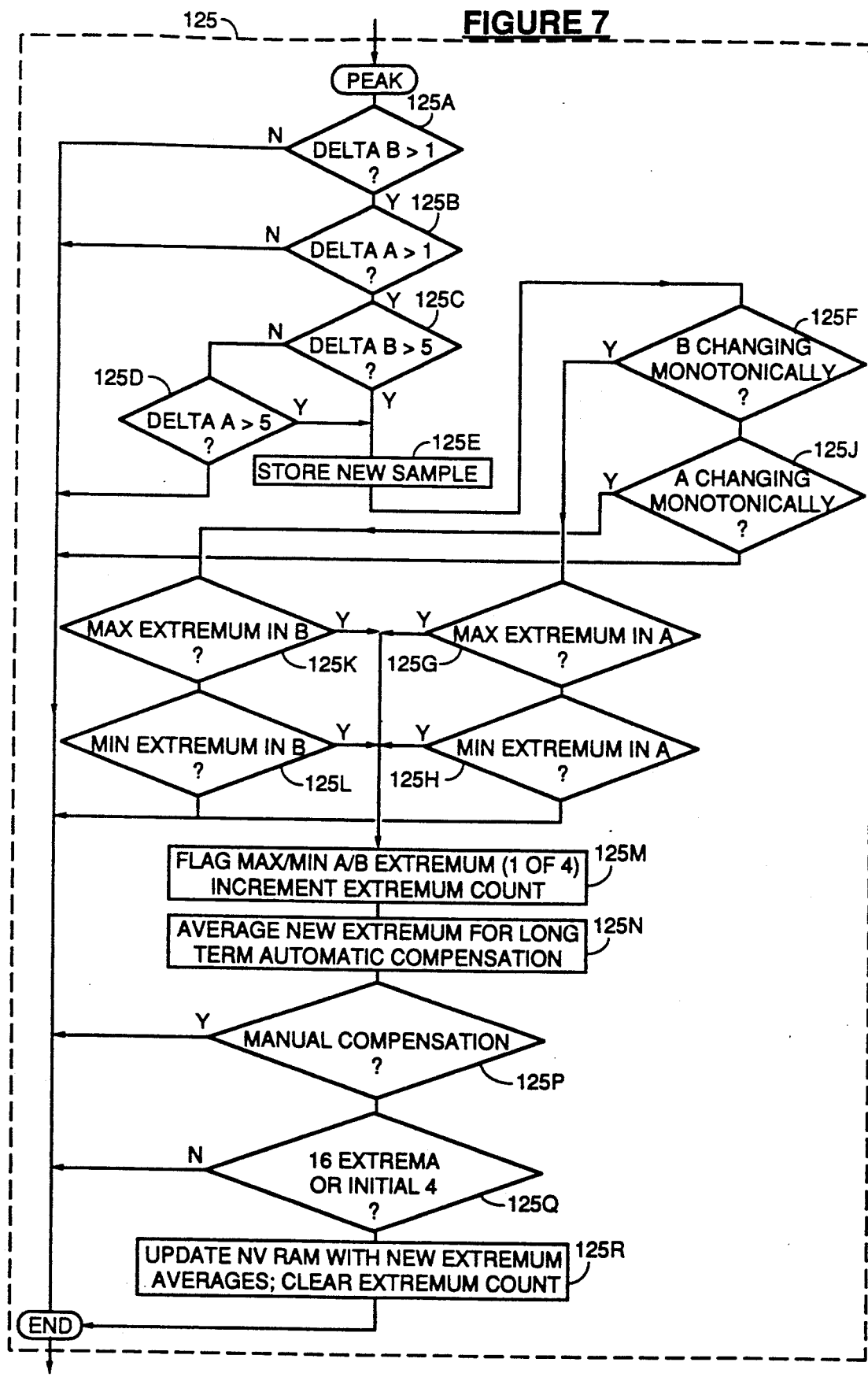
FIG. 7 shows a flow chart of the operation an extremum detection system for compensating an electronic compass.

Referring to the flow chart of FIG. 7, extremum detector step 125 is next explained. During operation, samples of data are recorded and stored in the memory of microprocessor 50 from the two channels (A and B) and are later analyzed to determine if an extremum has occurred. To qualify as a new sample point and be stored within microprocessor 50 at step 125E, the data in each channel must have changed by a finite threshold value as determined by steps 125A-125D. This prevents storing many samples of data along the same heading if the vehicle is at rest or traveling along a long straight road. In the current implementation, the criterion for storing a new sample point is the data in the extremum channel must have changed by at least 1 threshold increment of 8 A/D counts (steps 125A and 125B) and the data in the other channel must have changed by at least 5 threshold increments of 8 A/D counts (40 counts total) (steps 125C and 125D). In this embodiment, a total of five sample points per channel are recorded in the memory of microprocessor 50 (more or less could be used).

After recording the sample data points in microprocessor 50, the pattern stored in memory must pass two qualification tests to signify an extremum has occurred for compensation adjustment. For an A channel extremum to be detected and be used as a compensation data point, the data stored in the B channel memory (which has changed by at least 5 counts per sample) must be monotonically increasing or decreasing (step 125F) and the data in the A channel memory must have the center sample 5 greater than the samples on either side (max peak) as indicated by step 125G. Alternatively, the data stored in the B channel must be monotonically increasing or decreasing (step 125F) and the data in the A channel memory must have the center sample less than the samples on either side as indicated by step 125H. The fact that the B channel is always increasing or decreasing guarantees that the vehicle has continued to turn in the same direction and has not turned back. The criteria for detecting an B channel extremum are identical to the above but the axes are interchanged (steps 125J, 125K, 125L).

When an extremum in either channel is detected, the data associated with the extremum and indicative of a particular directional heading of the sensor is flagged during step 125M. The number of extrema detected for each quadrant of each channel is further recorded in step 125M. At step 125N, average long term extremum data is calculated for automatic compensation adjustment. If the compass is programmed in a manual compensation mode (step 125P), the extremum detector step 125 is completed.

If the compass is programmed in an automatic compensation mode (step 125P), the system continues to store additional extrema until the initial four extremum (one for each quadrant) of a channel are detected (step 125Q). When the initial four extrema are detected, the nonvolatile memory 51 is updated with the initial extremum data and the extremum count value is cleared (step 125R). During successive extremum detections, the system averages the additional extremum values at step 125N and cycles until sixteen peaks (in any quadrant) are detected for one of the channels (step 125Q). After sixteen peaks are detected and averaged, the nonvolatile memory is again updated and the extremum count value is cleared.

It should be noted that many methods may be used for averaging the extremum values detected during automatic compensation mode. In one embodiment, the extremum data stored in nonvolatile memory 51 is a running average of the previous extremum data stored in memory 51 (weighted by 15/16) and of the new extremum data (weighted by 1/16). Alternative averaging methods may be used without departing from the scope of the invention.

In addition, although the nonvolatile memory 51 is updated after accumulating sixteen extremum detection points in the embodiment illustrated in FIG. 7, nonvolatile memory 51 could be updated after accumulating and averaging any number of extremum detection points.

Additional criteria for detecting an extremum may be utilized. For example, for an A channel extremum to be detected using an alternative set of criteria, the B channel data must be monotonically increasing or decreasing by at least 5 counts per sample and the A channel data points must not change by more than 2 counts per sample. If 5 sample points pass this criterion, the algorithm indicates that a maximum or minimum value has occurred. Additional criteria are then required to determine if the sample is a maximum or minimum.

During both the manual compensation mode and the automatic compensation mode, the same extremum detection steps 125A-125P are executed to determine the occurrences of extrema. Since the same extremum detection steps 125A-125P are executed for both modes, rather than performing separate steps, less software is required to perform the system functions. A reduction in the amount of software required allows for a corresponding reduction in the amount of hardware required and thus a reduced cost. In addition, this permits an algorithm to be used for manual calibration which is much less likely to reach an erroneous conclusion than would otherwise be the case. Thus, improved performance of the electronic compass also results due to combined software for automatic and manual compensation.

Figure 8:
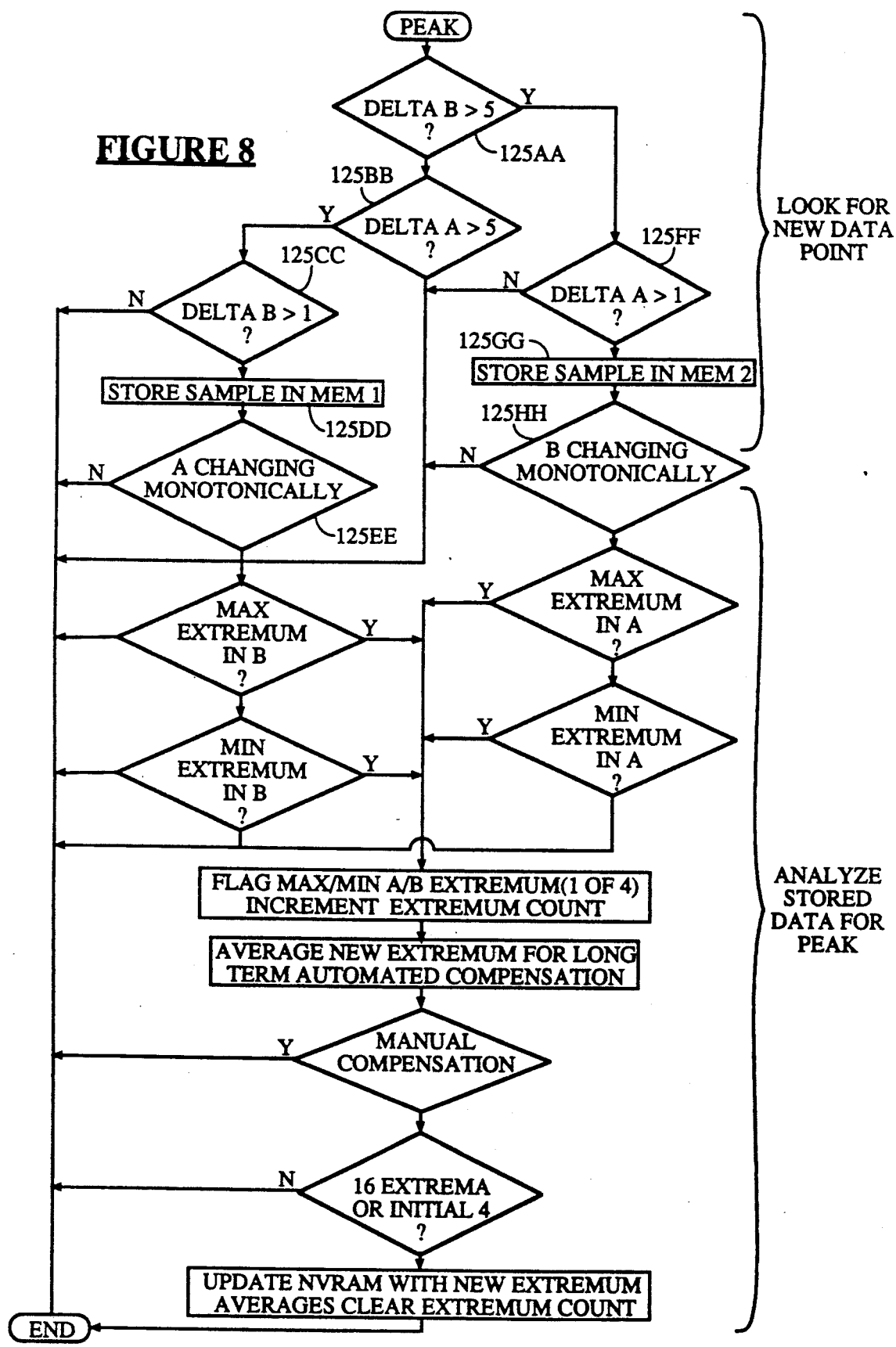
FIG. 8 shows a flow chart of the operation of a "separate memory locations" extremum detector system.

Furthermore, alternative algorithms may be used for extremum detection. One algorithm, referred to as a "separate memory location" detector algorithm, is illustrated in FIG. 8. The "separate memory location" detector is fundamentally the same as the one previously described except that two memory storage areas are allocated and the storage criteria for each set of samples is applied independently for each of the A and B channels (steps 125AA-125HH). This modification increases the noise immunity of the detector by not allowing data pairs to be stored if a noise excursion occurs in the B channel during periods when the B channel is changing slowly and the A channel is changing rapidly. If, for example, the A channel has changed by 3 and the B channel has changed by 1, no new sample would be stored in either detector. If however a momentary "noise" input causes the B channel to change by 5 and the A channel is not effected, i.e. still changed by 3, the original algorithm would store this new sample between real samples and cause the subsequent analysis to be confused. In the separate memory algorithm illustrated in FIG. 8, the data point would be stored in the B channel memory and not in the A channel memory which is where the current true samples are being stored. If the vehicle continues to traverse past the real peak, the erroneous sample point will not cause a true extremum to be missed or a false extremum to be detected. When the vehicle reaches a point where the B channel is again changing rapidly, and the A channel is flat, the extra point stored in the B channel memory is flushed out without creating the possibility of corrupting the data.

Figure 9:
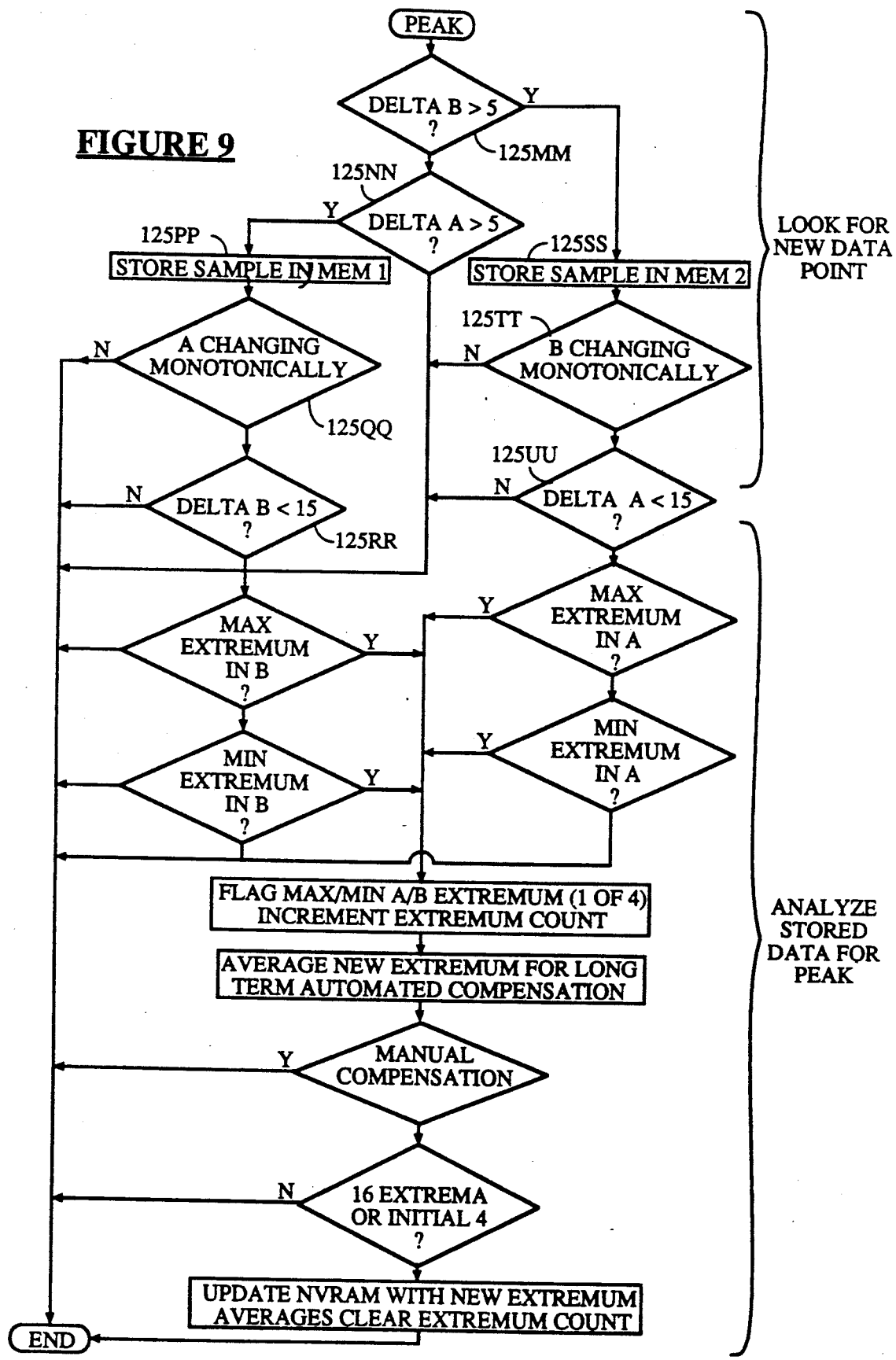
FIG. 9 shows a flow chart of the operation of a "minimum change" extremum detector system.

A third algorithm referred to as the "minimum change" extremum detection algorithm is illustrated in FIG. 9. The minimum change extremum detector is similar to the separate sample detector of FIG. 8 except the second qualification criteria is applied after the data point is stored in memory (steps 125MM-125NN and steps 125PP-125UU). The delta change in this case is on the This again has the potential of even further noise reduction as the average change of 5 points across the extremum is expected to be far less than 5 times the average change of one point. When the total excursion is seen to be above a threshold amount it can be concluded that the samples are either being taken away from the extremum position or that there is sufficient noise on the samples to render them useless for accurate data points.

Figure 10:
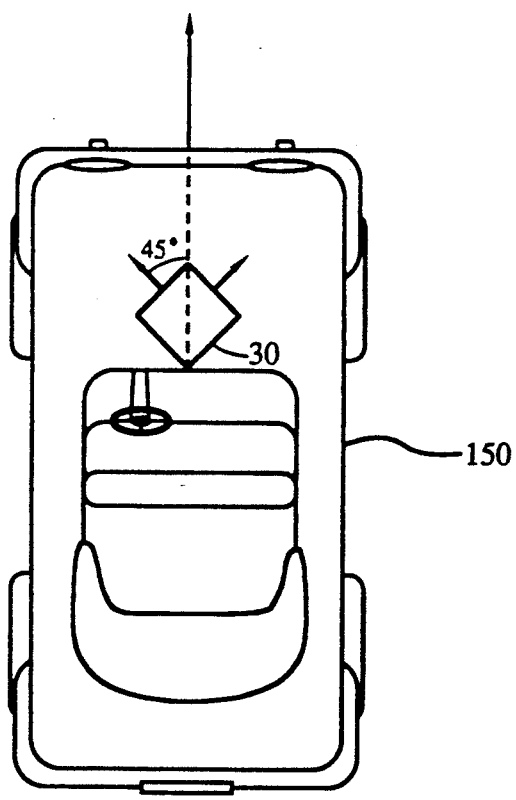
FIG. 10 illustrates angled mounting of a flux gate sensor within a vehicle.

Referring next to FIG. 10 and in accordance with another aspect of the invention, sensor 30 is mounted on a vehicle 150 such that one of the axes of sensing windings 32A and 32B is positioned at an angle of approximately 45° with respect to the longitudinal axis of vehicle 150 (the velocity direction of the vehicle while travelling straight). In the preferred embodiment, sensor 30 is mounted within the instrument cluster area (i.e., dashboard) of vehicle 150. Mounting sensor 30 in such an arrangement derives its benefit from the propensity to build roads in north-south and east-west directions across the United States, due to early U.S. legislation. This early U.S. legislation began with the Land Ordinance of 1785 which set out provisions for the apportionment and sale of land in the Northwest territory. The Northwest Territory was the current Great Lakes area, and this ordinance's significance as relates to this innovation is enhanced by the fact that this was the first of many significant territories added to the pre-Revolution boundaries. The ordinance provided for the establishment of townships composed of sections or square miles having boundaries defined by lines running in north-south and east-west directions. These boundary lines led to the construction of roads along them and parallel to them. Subsequent legislation extended this establishment of townships and sections to additional territories as they came under U.S. sovereignty.

Figure 11:
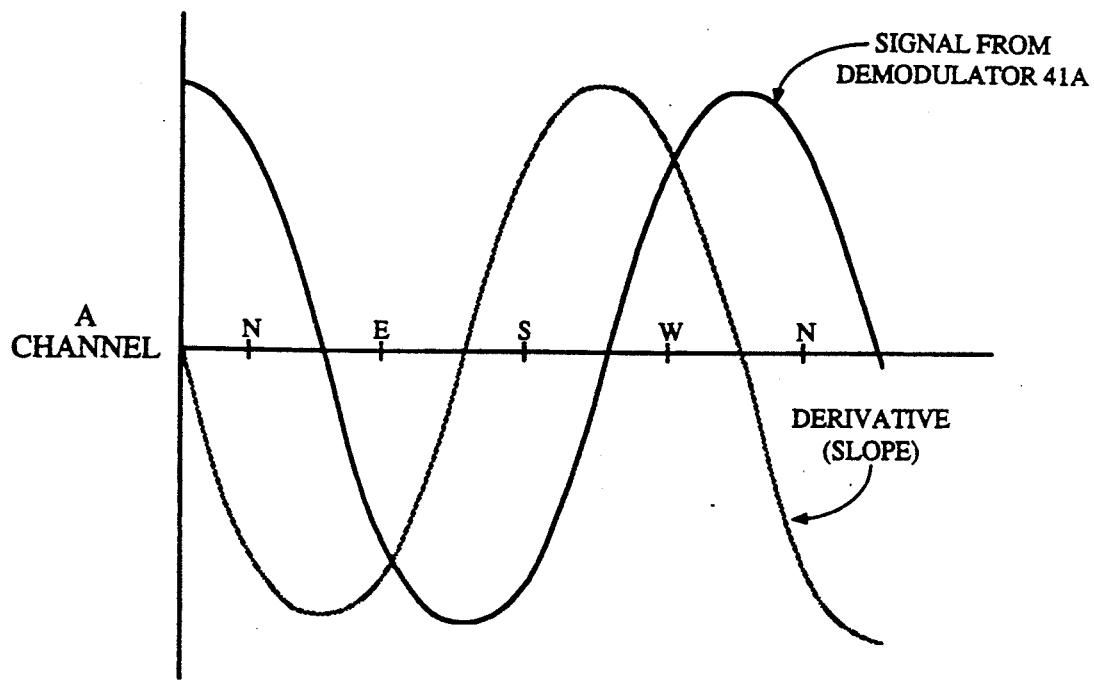
FIGS. 11 and 12 illustrate the output sensing signals and their derivatives for an angle-mounted flux gate sensor in a vehicle.
Figure 12:
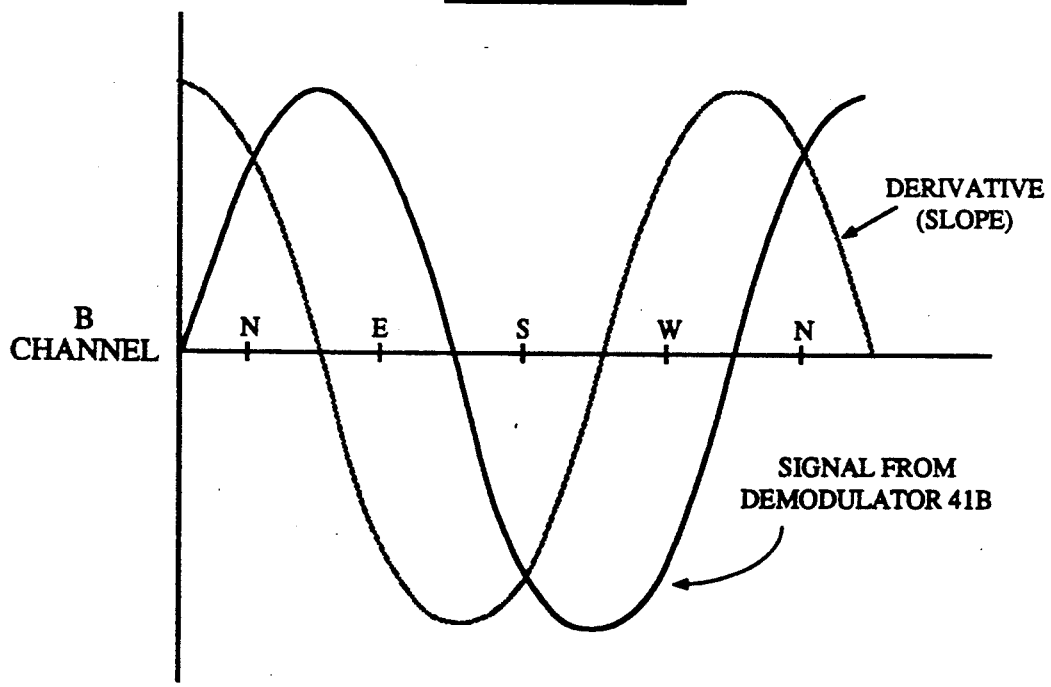

When sensor 30 is mounted with one axis of the sensing windings positioned at an angle of approximately 45° with respect to the longitudinal direction of vehicle 150, the sine wave signals from sensing windings 32A and 32B are passed through demodulators 41A and 41B and a pair of resulting DC voltage signals are provided to comparators 42A and 42B, respectively. Referring to FIGS. 11 and 12, the DC voltage signal values are shown relative to direction which are derived from each of the sensing winding output signals. The derivative slope values with respect to changes in direction are further shown in the FIGS..

As a result of the angled mounting of sensor 30, assuming the road system situates roads either north-south or east-west, flux gate sensor 30 provides strong signals from both sensing windings 32A and 32B (i.e., 0.707 or ½ the square root of 2.0 of full scale) at all times except when turning a corner as the vehicle is driven along the road system. Since sensor 30 provides strong signals and their derivatives except when turning, false detection of an extremum is less likely. Furthermore, when the vehicle is turned, an extremum occurs in a short period of time and therefore the extremum position can be more accurately determined since the time exposure to the effects of electrical noise as the vehicle passes through the extremum vicinity is limited. In addition, by minimizing the length of time during which the operating point remains in the vicinity of the extremum, the erroneous detection of false extrema is minimized since it is less likely that electrical noise will create the requisite pattern of output signals required to trigger or pass through the particular extremum detector used.

Although a 45° orientation of one axis of flux gate sensor 30 is optimum, other orientations are possible without departing from the scope of the invention..For example, axis angles as small as approximately 10 or as large as approximately 80 degree points also produce relatively large output signals and derivatives unless variation is also considered. Consideration of the ±20 degree variation across the 48 contiguous states of the U.S.A. results in a permissible range of orientation of an axis of the flux gate sensor relative to the longitudinal axis of the vehicle of 30 to 60 degrees.

It should be noted that the benefits derived by positioning the axis of the sensor at an angle from 30 to 60 degrees with respect to the longitudinal axis of the vehicle are also derived when the axis is rotated 180 degrees from such a position, and that such positions from 110 to 140 degrees are equivalents thereof.

Figure 13B:
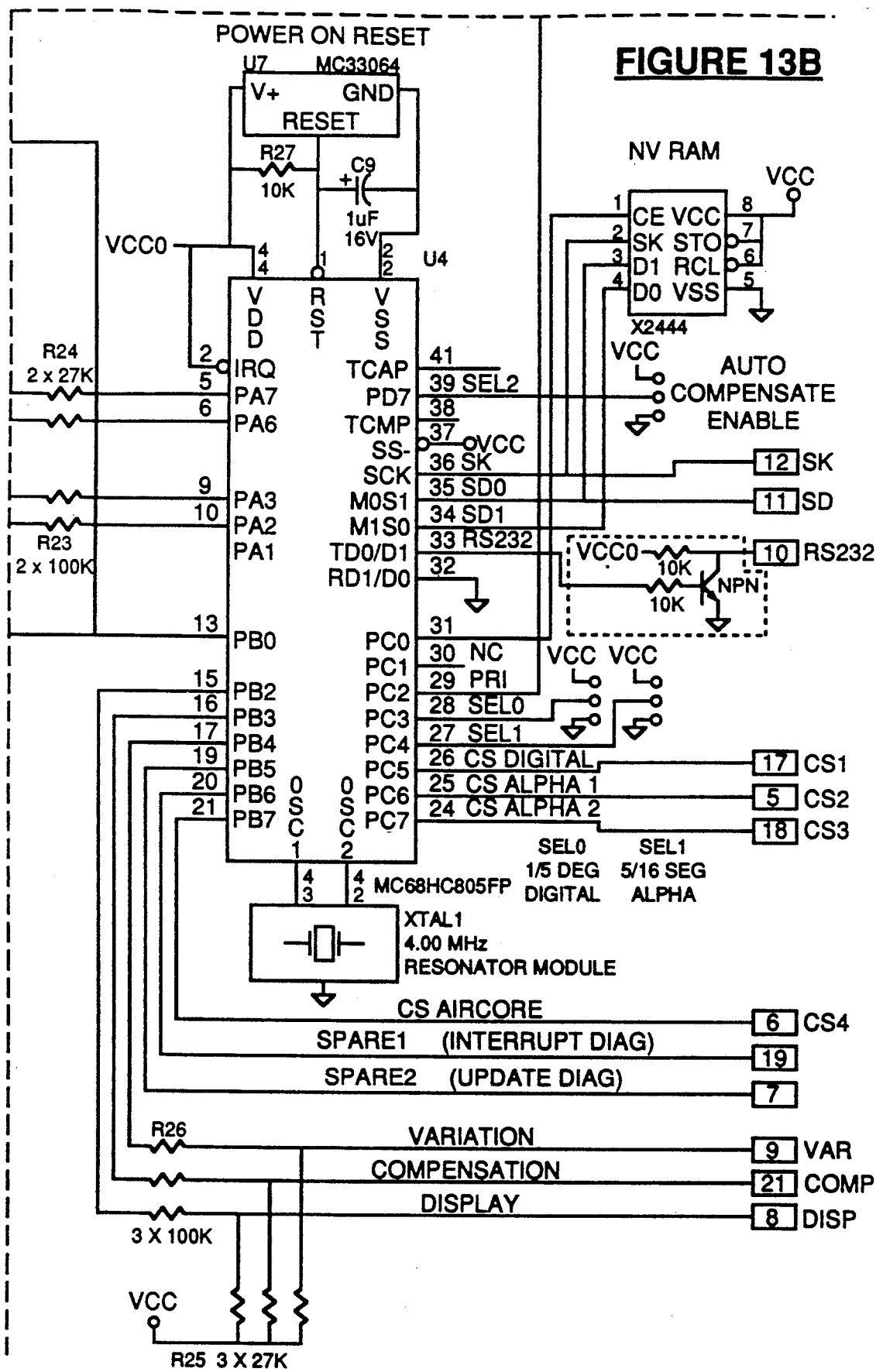
Figure 13C:
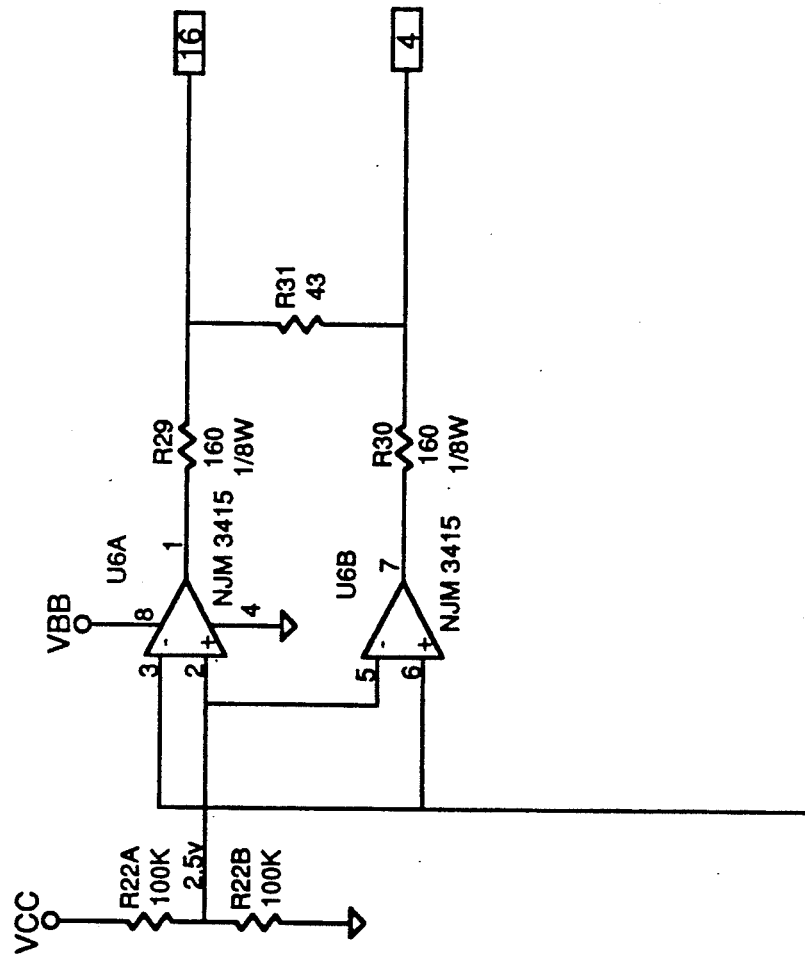
Figure 13D:
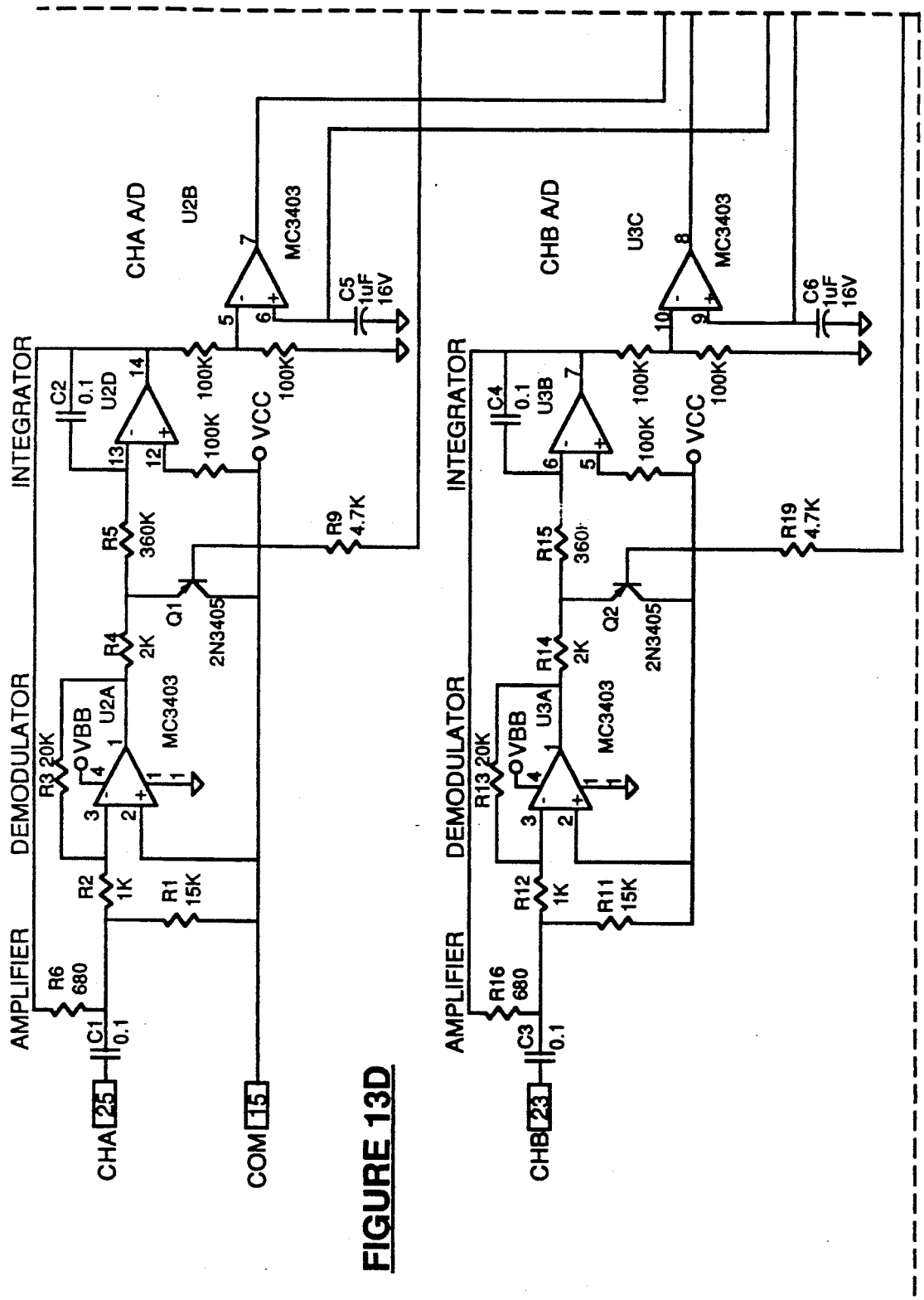

Referring next to FIGS. 13A-13D, and the legend of FIG. 13, a detailed schematic diagram is shown for a preferred embodiment (FIG. 5A) of an electronic compass to which the present invention is adapted. U1 is a three terminal regulator integrated circuit that converts the unregulated 10 to 16 volt ignition input to a regulated 5 volt VCC supply. VCC is used to power the logic circuits and to provide an analog reference. U1 is internally protected against reverse polarity and load dump transients. R1, D1 and C10 provide a filtered but unregulated nominal 12 volt supply (10 to 16 volts), VBB, for the analog circuitry. D1 provides transient protection for VBB.

A Motorola MC68HC05 processor is the heart of the electronic compass. It provides the timing signals to drive the primary winding of flux gate sensor 30 and to demodulate the low level second harmonic signal from sensor 30. The processor further contains the RAM and ROM memories and the integral I/O ports for performing all of the calculations necessary to convert the signals from flux gate sensor 30 to a magnetic heading which may be displayed in a variety of forms.

U7, a Motorola MC33064 IC provides a reliable reset signal whenever the power supply to the processor exceeds the normal operating ranges. This ensures that the processor will reliably re-start regardless of the type of transient which may be present at the input to the main power supply regulator.

XTAL1 is a self contained crystal with a feedback bias resistor and two bypass capacitors that provide all the external circuitry necessary to form an accurate crystal time base for the compass processor.

U6A and U6B are high current operational amplifiers that drive the primary coil of flux gate sensor 30 (not shown in FIG. 13) into saturation through the current limiting network R29, R30 and R31. Amplifiers U6A and U6B are driven by the logic level signal PR1, generated by the 6805 processor and are driven in opposite polarity to increase the available drive voltage.

Figure 1A:
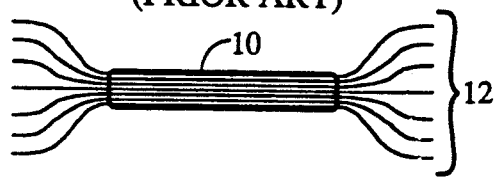
FIG. 1A illustrates the flow of flux lines from the earth's magnetic field in the vicinity of an unsaturated alloy iron strip.
Figure 1B:
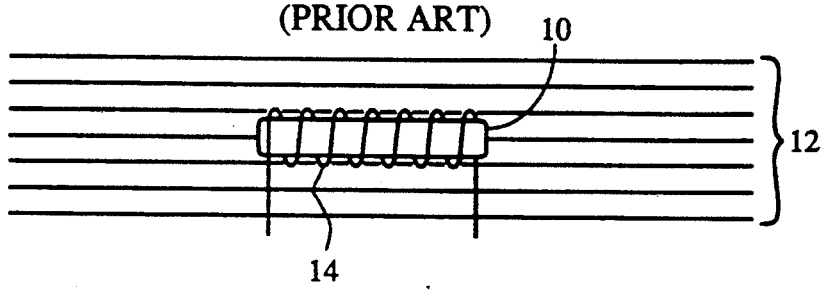
FIG. 1B illustrates the flow of flux lines from the earth's field in the vicinity of a saturated alloy iron strip.
Figure 1C:
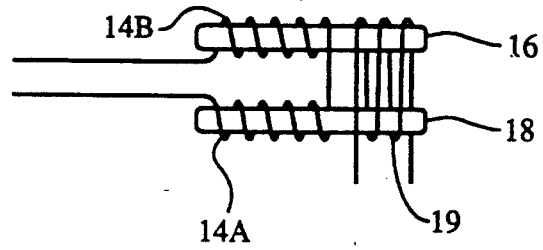
FIG. 1C illustrates a flux gate sensor comprising two alloy strips.
Figure 1D:
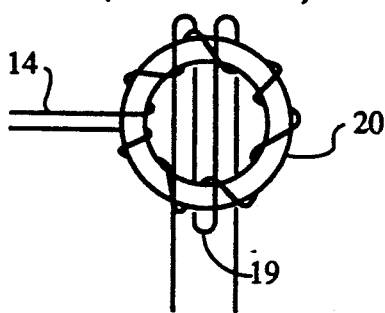
FIG. 1D illustrates a flux gate sensor comprising a toroidal core.
Figure 1E:
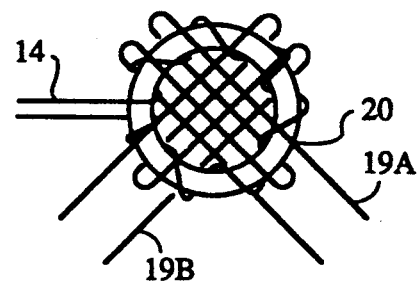
FIG. 1E illustrates a two axis flux gate sensor comprising a toroidal flux gate sensor comprising a toroidal core and orthogonally related sense windings.
Figure 2A:
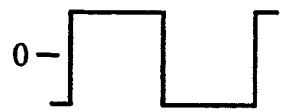
FIGS. 2A-2G illustrate waveforms within a typical flux gate sensor for the prior art implementation where a tuned filter was used to extract the second harmonic. It provides a starting point for understanding and implementing more sophisticated second harmonic extraction techniques as described herein.
Figure 2B:
Figure 2C:
Figure 2D:
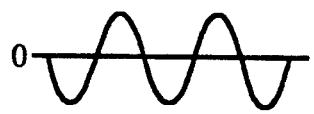
Figure 2E:
Figure 2F:
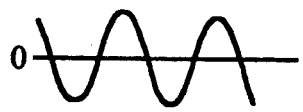
Figure 2G:

The sensor used in the preferred embodiment (not shown in FIG. 13) is a toroid of a high permeability magnetic material with a precision primary winding wrapped around its circumference and two sensing windings wound around the exterior of the toroid assembly. The sensor primary is alternately driven into saturation in both directions. In the absence of an external magnetic field, the toroid is balanced such that there is no magnetic field outside the toroid assembly and such that no signal is induced in the sensing windings. When an external magnetic field is present, the field on one side of the toroid is enhanced while the field on the other side is opposed. This causes one half of the toroid to saturate slightly before the other creating a momentary magnetic field imbalance. This imbalance induces a small current in the sensing winding proportional to the strength of the magnetic field. This current is the area under the pulses of FIG. 2C.

The sensing signal from each orthogonal sensing winding is provided to the microprocessor through identical sets of circuitry, and only one channel is described herein. U2A is an AC amplifier which is used to boost the second harmonic signal from the flux gate sensor to a level that is usable by the demodulator portion of the circuit. The minimum gain of amplifier U2A is determined from the sensitivity of the sensor, the resolution of the comparator and the accuracy that is required by the compass circuit.

Q1 forms a half wave synchronous demodulator that provides a minimum of 60 db rejection of signals that are not exactly in phase with the DEMOD signal from PB0 line of the 6805 processor. This signal is produced at exactly twice the fundamental drive frequency and is phase shifted by 90 degrees to correspond to the second order harmonic signal produced by sensor 30 in the presence of an external magnetic field. This type of demodulator is often essential to extract the extremely small second harmonic signal in the presence of other "noise" signals.

R5 and C2 are connected to U2D to form a high gain dc integrator. The integrator continuously sums the output of the synchronous demodulator. The output of the integrator is then fed back to the sense winding through the resistor R6. Any current flowing through R6 flows through the sense windings and creates an opposing magnetic field inside the sensor.

The flux gate amplifier is a closed loop servo system that maintains a zero level of magnetic flux inside the sensor to improve accuracy and stability. A DC current is injected into the sense windings to oppose any external magnetic field. A measurement of this current is thus a measurement of the amount of external flux present at the sensor (assuming there is no residential flux from the sensor itself). In operation, whenever there is any non-zero amount of flux inside the sensor, a second order harmonic signal is induced in the sense winding, it is amplified, demodulated and integrated by the above mentioned circuit sections. The polarity of the integration is designed so that the output of the integrator which is fed back to the sense windings will always change in the direction to oppose the disturbing signal.

The A/D conversion for monitoring the magnitude of the magnetic flux present at the sensor is performed by comparing the output of a PWM D/A converter with the voltage across resistor R6. The PWM D/A is a simple RC filter R8, C5 connected to the output from PA3 of the microprocessor. The comparison of the two voltages is performed by op amp U2B. At regular time intervals, the output of the comparator is sampled and the output to the PWM filter is set to the opposite polarity of the comparator signal. In this way, the voltage across C5 will always be equal to the voltage across R6 and a calculation of the duty cycle necessary to maintain this equilibrium is representative of the unknown voltage. This method of A/D conversion is relatively slow but is totally immune to changes in component values over time and temperature.

U5 is an Xicor X2444 serial interface nonvolatile EEPROM memory IC. Memory U5 stores the calculated compensation factors of gain and offset that are unique for each sensor installation so that the headings displayed by the electronic compass are accurate. Memory U5 also saves the last selected display mode, thus eliminating the need for an external battery input to the electronic compass to retain this information. For automatic compensation, a running average of extrema from sensor 30 is also stored in memory U5.

The electronic compass has outputs available to provide several display options. An alphanumeric display driver may be coupled to pins PC5, PC6, and PC7 of the microprocessor, and may be used to drive alphanumeric displays (or alpha or numeric displays). An ALPHA display option provides a display in alpha characters such as N, NNW, NW, etc. Display resolution is available in eight or sixteen segments as determined by jumper selection. Eight segments are N, NE, E, ... W, NW while sixteen segments are N, NNE, NE, ENE, ... NW, NNW.

When selected, a numeric display option provides a numeric readout of heading in degrees from 000 to 359. Display resoultion is available in either 1 or 5 degrees increments as determined by jumper selection. Provision of other increments would simply require reprogramming of the microcomputer.

A CRT display output is provided by the RS-232 serial port for displaying heading information. Furthermore, an air core gauge display option provides an output to a driver chip suited to driving an automotive, air-core type display element.

It should be noted that although the disclosed embodiment shows a variety of display capability, the display or displays provided within another embodiment may be different without departing from the scope of the invention.

Figure 14:
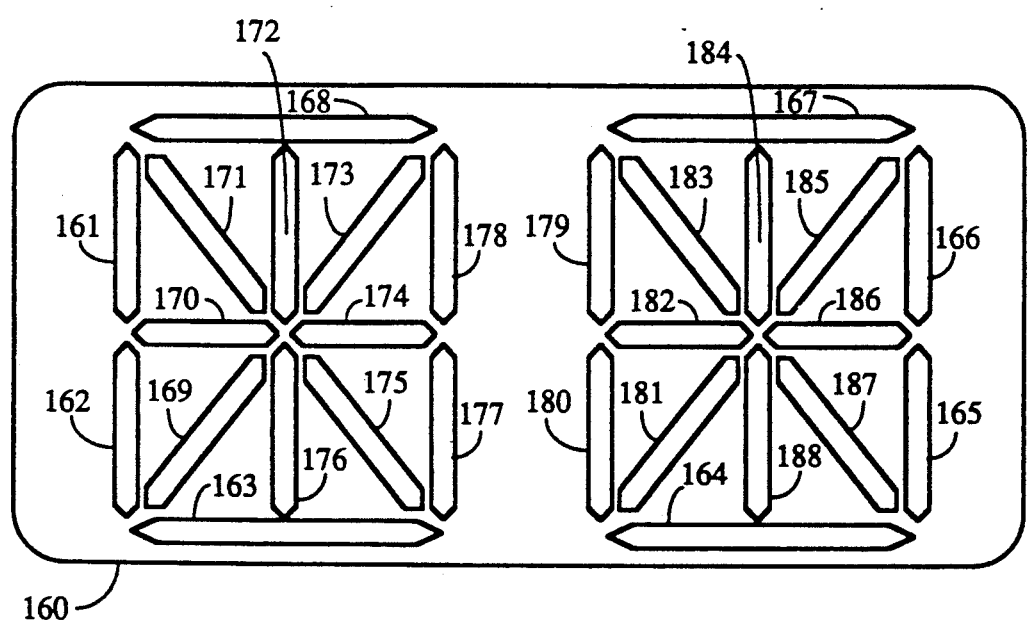
FIG. 14 illustrates an output display for an electronic compass.

Referring to FIG. 14 and in accordance with a final aspect of the invention, alphanumeric display 160 includes a plurality of segments 161-188 that are controlled during manual compensation mode such that one or more of the segments 161-168 positioned around the periphery are selectively illuminated to display the sense of going around a closed path. Such display prompts the operator of the vehicle to drive in a circular path during the manual compensation mode of the compass. By using the outer peripheral segments 161-168 of display 160, additional segments and segment drivers are not necessary, thus reducing cost and size requirements.

Referring back to the flow diagram of FIG. 6 in conjunction with FIG. 14, when the electronic compass is programmed in a manual compensation mode, the system records four extremum values as the compass is rotated 360 degrees (as the vehicle is driven in a circle). As the compass is rotated, the rotating segment display step 13o is repetitively executed at a fixed rate. Upon the first execution of the step 130, segment 168 of display 160 is illuminated while all other segments are deactivated. After a short time delay, segment 168 is deactivated and segment 161 is activated. After an additional time delay, segment 161 is deactivated and segment 162 is activated, and so on. The process repeats until each of the segments 161-168 has been illuminated to prompt the operator to drive the vehicle in a circle. The rotating segment display procedure may thereafter repeat and continue the circular illumination of the segments until the vehicle completes its circular path.

The rotating segment display step 130 may be alternatively implemented to indicate the approximate angular position of the vehicle relative to a starting position while driving in a circle. Upon the first execution of the step 130, segment 168 of display 160 is illuminated While all other segments are deactivated. As the compass sensor is rotated clockwise (as the vehicle is driven in a circle), segment 168 is deactivated and segment 161 is activated. When the sensor is rotated further, segment 161 is deactivated and segment 162 is activated, and so on. The process repeats until each of the segments 161-168 has been illuminated to indicate the approximate angular position of the compass relative to a starting position.

Other methods for illuminating the segments 161-168 may be implemented to prompt the operator to drive the vehicle in a circle or to indicate the approximate angular position of the compass relative to a starting position. For example, segments 161-168 may be sequentially illuminated (and remain illuminated) as the compass is rotated 360 degrees. Alternatively, pairs of opposing (separated by 180 degrees) segments may be selectively energized; i.e., initially energize segments 161 and 165 simultaneously, then energize segments 162 and 166 simultaneously, then energize segments 163 and 167, and so on.

It should be finally noted that although the magnetic sensor used in the described embodiments is a dual axis flux gate sensor, other sensors may be utilized. For example, a magnetoresistive sensor may be used without departing from the scope of the invention.

The embodiment described above is intended to be exemplary and not limiting. In view of the above disclosure, further modifications will be obvious to one of ordinary skill in the art without departing from the scope of the invention.

We claim:

1. An electronic compass comprising:
   a magnetic field sensing means having a plurality of output lines wherein each of said output lines provides an output signal indicative of the earth's magnetic field;
   measuring means coupled to said output lines for measuring said output signals;
   detecting means for detecting a first pattern of values of a first one and a second one of said output signals over a range of consecutive orientations of said sensing means and for detecting a second pattern of values of said first and said second output signals over the same range of consecutive orientations of said sensing means;
   signalling means coupled to said detecting means for generating an extremum detection signal only when said detection means detects both said first pattern of values of one of said output signals and said second pattern of values of the other of said output signals, said first or said second pattern of values including non extremum values on each side of said extremum signal, wherein said extremum detection signal indicates the occurrence of a relative extremum value of one of said output signals with respect to the orientation of said sensing means within the earth's magnetic field; and
   compensation means coupled to said signalling means for providing a compensated direction signal indicative of the orientation of said sensing means within the magnetic field wherein the compensated direction signal is dependent upon the extremum detection signal.

2. The electronic compass as recited in claim 1 wherein said measuring means stores a plurality of consecutively generated values of the first sensing signal and a plurliaty of consecutively generated values of the second sensing signal, and wherein said signalling means generates said extremum detection signal only if a plurlaity of consecutvie values of one of said sensing signals changes monotonically and a plurality of consecutive values of the other of said sensing signals does not change monotonically.

3. The electronic compass as recited in claim 1 wherein the generation of said extremum detection signal depends upon the simultaneous occurrence of said two distinct patterns and does not depend upon an earlier-calculated estimate of an extreme value.

4. The electronic compass as recited in claim 1 wherein said detecting means detects a plurality of extrema corresponding to a first extremum direction of said sensor and wherein said compensation means generates said compensated direciton signal dependent upon said plurality of extrema corresponding to said first extremum direction before an extremum corresponding to a second extremum direction must be detected.

5. The electronic compass as recited in claim 1 wherein said detecting means detects an initial extremum corresponding to a first extremum direction by way of a first preprogrammed routine and wherein said detecting means detects all subsequent extrema corresponding to said first extremum direction by way of the same said first preprogrammed routine.

6. An electronic compass comprising:
   a flux gate sensor having a primary windign, a first sensing winding for generating a first sensing signal, and a second sensing winding orthogonally situated with said first sensing winding for generating a second sensign signal;
   driving means coupled to said primary winding;
   measuring means coupled to said first and said second sensing windings for measuring said first and said second sensing signals;
   detecting means for detecting a first pattern of values of said first and said second sensign signals over a range of consecutive orientations of said sensor and for detecting a second pattern of values of said first and said second sensing signals over the same range of consecutive orientations of said sensor;
   signalling means coupled tos aid detecting means for generating an extremum detection signal only when said detection means detects both said first pattern of values of one of said sensing signals and said second pattern of values of the other of said sensing signals, said first or said second pattern of values includign non-extremum values on each side of said extremum signal, wherien the extremum detection signal indicates the occurrence of an extremum value of one of said sensing signals relative to the orientation of said sensor; and
   compensation means coupled to said signalling means for providing a compensated direction signal dependent upon the extremum detection signal.

7. The electronic compass as recited in calim 6 wherein said signalling means generates said extremum detection signal only if said first pattern of values of one of said sensing signals is a pattern whose values change monotonically over said range of consecutive sensor orientations and the first derivative of said second pattern of values of the other of said sensing signals has a value which passes through zero over said range of consecutive sensor orientations.

8. The electronic compass as recited in claim 6 wherein said detecting means detects consecutively a first sampled value, a second sampled value, and a third sampled value of the first sensing signal, and detects consecutively a fourth sampled value, a fifth sampled value, and a sixth sampled value of the second sensign signal, and wherein said signalling means generates the extremum detection signal if said second sampled value is greater than said first sampled value and greater than said third sampled value, and if said fifth sampled value is greater than said fourth sampled value and less than said sixth sampled value.

9. The electronic compass as recited in claim 8 wherein said signalling means further generates the extremum detection signal if said second sampled value is less than said first sampled value and less than said third sampled value, and if said fifth sampled value is greater than said fourth sampled value and less than said sixth sampled value.

10. The electronic compass as recited in claim 9 wherein said signalling means detects further generates the extremum detection signal if said second sampled value is greater than said first sampled value and greater than said third sampled value, and if said fifth sampled value is less than said fourth sampled value and greater than said sixth sampled value.

11. The electronic compass as recited in claim 10 wherein said signalling means further generates the extremum detection signal if said second sampled value is less than said first sampled value and less than said third sampled value, and if said fifth sampled value is less than said fourth sampled value and greater than said sixth sampled value.

12. The electronic compass as recited in claim 11 wherein the compensated direction signal is provided to a display means.

13. The electronic compass as recited in claim 11 wherein said detecting means detects and stores said second sampled value if said second sampled value differs from a previously detected value of the first sensing signal by at least a first fixed default quantity, and stores said fifth sampled value if said fifth sampled value differs from a previously detected value of the second sensing signal by at least a second fixed default quantity.

14. The electronic compass as recited in claim 10 wherein said previously detected value is a previously stored value.

15. The electronic compass as recited in claim 6 wherein said detecting means detects consecutively a first sampled value, a second sampled value, a third sampled value, a fourth sampled value, and a fifth sampled value of the first sensing signal, and detects consecutively a sixth sampled value, a seventh sampled value, an eighth sampled value, a ninth sampled value, and a tenth sampled value, and wherein said signalling means generates the extremum detection signal if said second sampled value is greater than said first sampled value and less than said third sampled value, and if said fourth sampled value is greater than said fifth sampled value and less than said third sampled value, and if said seventh sampled value is greater than said sixth sampled value and less than said eighth sampled value, and if said ninth sampled value is greater than said eighth sampled value and less than said tenth sampled value.

16. The electronic compass as recited in claim 15 wherein said signalling means further generates the extremum detection signal if said second sampled value is less than said first sampled value and greater than said third sampled value, and if said fourth sampled value is less than said fifth sampled value and greater than said third sampled value, and if said seventh sampled value is greater than said sixth sampled value and less than said eighth sampled value, and if said ninth sampled value is greater than said eighth sampled value and less than said tenth sampled value.

17. The electronic compass as recited in claim 16 wherein said signalling means further generates the extremum detection signal if said second sampled value is less than said first sampled value and greater than said third sampled value, and if said fourth sampled value is less than said fifth sampled value and greater than said third sampled value, and if said seventh sampled value is less than said sixth sampled value and greater than said eighth sampled value, and if said ninth sampled value is less than said eighth sampled value and greater than said tenth sampled value.

18. The electronic compass as recited in claim 17 wherein said signalling means further generates the extremum detection signal if said second sampled value is greater than said first sampled value and less than said third sampled value, and if said fourth sampled value is greater than said fifth sampled value and less than said third sampled value, and if said seventh sampled value is less than said sixth sampled value and greater than said eighth sampled value, and if said ninth sampled value is less than said eighth sampled value and greater than said tenth sampled value.

19. The electronic compass as recited in claim 18 wherein the extremum detection signal is generated only if the absolute value of the difference between said first sampled value and said second sampled value is less than a predetermined amount, and if the absolute value of the difference between said second sampled value and said third sampled value is less than said predetermined amount, and if the absolute value of the difference between said third sampled value and said fourth sampled value is less than said predetermined amount, and if the absolute value is the difference between said fourth sampled value and said fifth sampled value is less than said predetermined amount.

20. The electornic compass as recited in claim 6 wherein said detecting means samples a plurality of values of said first sensing signal and a plurality of values of said second sensign signal, and wherein said plurality of values of said first sensing signal are stored within a first set of memory locations and wherein said plurality of values of said second sensing signal are stored within a second set of memory locations, and wherein said first and second sets of memory locations are mutually exclusive.

21. The electronic compass as recited in claim 20 wherein a second value of said plurality of values of said first sensign signal is stored only if said second value has changed at least a predetermined fixed amount from a previously stored value.

22. The electronic compass as recited in claim 6 further comprising mounting means for supporting said flux gate sensor on a vehicle such that the axis of said first sensing winding is situated at an angle from 30 to 60 degrees relative to the longitudinal direction of said vehicle.

23. The electronic compass system as recited in claim 22 wherein said mounting means positions said flux gate sensor such that the axis of said first sensing winding is situated at an angle of approximatley 45 degrees relative to the longitudinal direciton of said vehicle.

24. An electronic compass comprising:
a magnetic field sensing means having a plurality of output lines wherein each of said output lines provides an output signal indicative of the earth's magnetic field;
measuring means coupled to said output lines for measuring said output signals;
detecting means for detecting a first pattern of values of a first one and a second one of said output signals over a range of consecutive orientations of said sensing means and for detecting a second pattern of values of said first and said second output signals over the same range of consecutive orientations of said sensing means;
signalling means coupled to said detecting means for generating an extremum detection signal only when said detection means detects both said first pattern of values of one of said output signals and said second pattern of values of the other of said output signals, wherein said extremum detection signal indicates the occurrence of a relative extremum value of one of said output signals with respect to the orientation of said sensing means within the earth's magnetic field;
said extremum signal having non-extremum values on both sides thereof, wherein said range of consecutive orientations of said sensing means includes orientations which product both said non-extremum values and said extremum value; and
compensation means coupled to said signalling means for providing a compensated direction signal indicative of the orientation of said sensing means within the earth's magnetic field wherien the compensated direction signal is dependent upon the extremum detection signal.

* * * * *

UNITED STATES PATENT AND TRADEMARK OFFICE
CERTIFICATE OF CORRECTION

PATENT NO. : 5,161,311
DATED : November 10, 1992
INVENTOR(S) : Esmer et al.

It is certified that error appears in the above-identified patent and that said Letters Patent is hereby corrected as shown below:

Col. 19 line 36:

Delete "plurlaity" and insert --plurality--.

Col. 19 line 53:

Delete "direciton" and insert --direction--.

Col. 19 line 66:

Delete "windign" and insert --winding--.

Col. 20 line 8:

Delete "sensign" and insert --sensing--.

Col. 20 line 13:

Delete "tos aid" and insert --to said--.

UNITED STATES PATENT AND TRADEMARK OFFICE
CERTIFICATE OF CORRECTION

PATENT NO. : 5,161,311
DATED : November 10, 1992
INVENTOR(S) : Esmer et al.

It is certified that error appears in the above-identified patent and that said Letters Patent is hereby corrected as shown below:

Col. 20 line 18:

Delete "includign" and insert --including--.

Col. 20 line 20:

Delete "wherien" and insert --wherein--.

Col. 20 line 27:

Delete "calim" and insert --claim--.

Col. 20 line 41:

Delete "sensign" and insert --sensing--.

Col. 21 line 13:

Delete "10" and insert --13--.

UNITED STATES PATENT AND TRADEMARK OFFICE
CERTIFICATE OF CORRECTION

PATENT NO.   :   5,161,311
DATED        :   November 10, 1992
INVENTOR(S)  :   Esmer et al.

It is certified that error appears in the above-identified patent and that said Letters Patent is hereby corrected as shown below:

Col. 22 line 6:

Delete "is" and insert --of--.

Col. 22 line 12:

Delete "sensign" and insert -sensing--.

Col. 22 line 20:

Delete "sensign" and insert --sensing--.

Col. 22 line 60:

Delete "product" and insert --produce--.

Col. 22 line 65:

Delete "wherien" and insert --wherein--.

Signed and Sealed this

Twenty-sixth Day of October, 1993

Attest:

BRUCE LEHMAN

Attesting Officer

Commissioner of Patents and Trademarks